US009043571B2

United States Patent
Matsuya et al.

(10) Patent No.: US 9,043,571 B2
(45) Date of Patent: May 26, 2015

(54) MANAGEMENT APPARATUS AND MANAGEMENT METHOD

(75) Inventors: Kazuhiro Matsuya, Yokohama (JP); Takahiko Tomida, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 170 days.

(21) Appl. No.: 13/806,863

(22) PCT Filed: Sep. 11, 2012

(86) PCT No.: PCT/JP2012/073115
§ 371 (c)(1),
(2), (4) Date: Dec. 26, 2012

(87) PCT Pub. No.: WO2014/041591
PCT Pub. Date: Mar. 20, 2014

(65) Prior Publication Data
US 2014/0075143 A1    Mar. 13, 2014

(51) Int. Cl.
*G06F 12/00* (2006.01)
*G06F 12/02* (2006.01)
*G06F 3/06* (2006.01)

(52) U.S. Cl.
CPC .............. *G06F 12/02* (2013.01); *G06F 3/0607* (2013.01); *G06F 3/0635* (2013.01); *G06F 3/067* (2013.01)

(58) Field of Classification Search
USPC .......................................... 711/114, 165, 170
See application file for complete search history.

(56) References Cited

U.S. PATENT DOCUMENTS

| | | |
|---|---|---|
| 2005/0216591 A1 | 9/2005 | Sato |
| 2006/0230189 A1 | 10/2006 | Sahara et al. |
| 2006/0242363 A1 | 10/2006 | Tamura et al. |
| 2008/0059697 A1 | 3/2008 | Sakaki et al. |
| 2011/0208940 A1 | 8/2011 | Naganuma et al. |
| 2012/0005446 A1* | 1/2012 | Furuhashi ..................... 711/170 |
| 2012/0079226 A1 | 3/2012 | Kihara et al. |

FOREIGN PATENT DOCUMENTS

| | | |
|---|---|---|
| JP | 2005-107645 A | 4/2005 |
| JP | 2005-276017 A | 10/2005 |
| JP | 2006-293459 A | 10/2006 |
| JP | 2008-065561 A | 3/2008 |
| JP | 2012-504789 A | 2/2012 |
| WO | 2012042678 A1 | 4/2012 |

* cited by examiner

*Primary Examiner* — Jasmine Song
(74) *Attorney, Agent, or Firm* — Mattingly & Malur, PC

(57) ABSTRACT

Proposed are a management apparatus and a management method capable of improving the stability of the overall computer system. In a computer system which manages a storage area provided by each of a plurality of mutually connected storage apparatuses as a logical pool, provides to a host computer a virtual volume associated with the logical pool, and assigns a real storage area from the logical pool to the virtual volume when the host computer writes into the virtual volume, when a storage apparatus is added to the plurality of storage apparatuses, the host computer is controlled to switch the access path to the added storage apparatus.

14 Claims, 24 Drawing Sheets

Fig.6

| HOST COMPUTER PORT ID | PHYSICAL STORAGE APPARATUS ID | PHYSICAL STORAGE APPARATUS PORT ID | LUN | ACCESS PATH SETTING INFORMATION |
|---|---|---|---|---|
| Host-Port11 | Storage1 | Storage-Port11 | LUN-11 | true |
| Host-Port12 | Storage2 | Storage-Port21 | LUN-21 | false |
| Host-Port13 | Storage3 | Storage-Port31 | LUN-31 | false |
| ... | ... | ... | ... | ... |
| 17A | 17B | 17C | 17D | 17E |

| PHYSICAL STORAGE DEVICE ID | PHYSICAL PAGE ID |
|---|---|
| Device-1 | PhysicalPage11 |
|  | PhysicalPage12 |
|  | ... |
| Device-2 | PhysicalPage21 |
|  | ... |
| ... | ... |
| 32A | 32B |

| VIRTUAL VOLUME ID | LOGICAL PAGE ID | PHYSICAL STORAGE APPARATUS ID | PHYSICAL PAGE ID |
|---|---|---|---|
| VVOL-1 | LogicalPage11 | Storage-1 | PhysicalPage11 |
|  | LogicalPage12 | Storage-1 | PhysicalPage12 |
|  | LogicalPage13 | Storage-2 | PhysicalPage21 |
| VVOL-2 | LogicalPage21 | Storage-1 | PhysicalPage13 |
|  | ... | ... | ... |
| ... | | | |

| VIRTUAL VOLUME ID | LUN | PHYSICAL STORAGE APPARATUS PORT ID | HOST COMPUTER PORT ID |
|---|---|---|---|
| VVOL-1 | LUN-1 | Storage-Port11 | Host-Port11 |
| VVOL-2 | LUN-2 | Storage-Port21 | Host-Port21 |
| ... | ... | ... | ... |
| 34A | 34B | 34C | 34D |

| PHYSICAL STORAGE APPARATUS ID |
|---|
| Storage-1 |
| Storage-2 |
| Storage-3 |
| ... |
| 35A |

| VIRTUAL VOLUME ID | I/O COUNT | AVERAGE RESPONSE TIME |
|---|---|---|
| VVOL-1 | 100 | 4ms |
| VVOL-2 | 200 | 4ms |
| ... | ... | ... |
| 36A | 36B | 36C |

| CPU BUSY RATE AVERAGE VALUE | CACHE MEMORY UTILIZATION AVERAGE VALUE |
|---|---|
| 30% | 40% |
| 37A | 37B |

| PORT ID | DESTINATION NODE ID | DESTINATION PORT ID | DATA TRAFFIC AVERAGE VALUE |
|---|---|---|---|
| Storage-Port11 | Host-1 | Host-Port11 | 50MB/s |
| Storage-Port12 | Storage-2 | Storage-Port21 | 40MB/s |
| Storage-Port13 | Storage-3 | Storage-Port31 | 30MB/s |
| ... | ... | ... | ... |
| 38A | 38B | 38C | 38D |

| PORT ID | PORT TYPE | MAXIMUM DATA TRAFFIC THEORETICAL VALUE |
|---|---|---|
| Storage-Port11 | 4Gbps-FC | 500MB/s |
| Storage-Port12 | 4Gbps-FC | 500MB/s |
| ... | ... | ... |
| 39A | 39B | 39C |

| PHYSICAL STORAGE APPARATUS ID | ADDED APPARATUS INFORMATION | CAPACITY CONSUMPTION BALANCE SETTING |
|---|---|---|
| Storage-1 | false | false |
| Storage-2 | false | true |
| Storage-3 | false | false |
| Storage-4 | true | true |
| ... | ... | ... |

| PHYSICAL STORAGE APPARATUS ID | CPU BUSY RATE SETTING VALUE | CACHE MEMORY UTILIZATION SETTING VALUE | CAPACITY CONSUMPTION SETTING VALUE |
|---|---|---|---|
| Storage-4 | 30% | 30% | 30% |
| ... | ... | ... | ... |

| VIRTUAL VOLUME ID | PERFORMANCE DETERIORATION INFORMATION | RESPONSE TIME THRESHOLD CONTINUOUS OVERRUN PERIOD | ACCESS PATH AUTOMATIC SWITCHING SETTING |
|---|---|---|---|
| VVOL-1 | true | 0s | true |
| VVOL-2 | false | 60s | false |
| VVOL-3 | true | 0s | false |
| ... | ... | ... | ... |
| 64A | 64B | 64C | 64D |

| VIRTUAL VOLUME ID | PERFORMANCE DETERIORATION DETECTION DATE/TIME |
|---|---|
| VVOL-1 | 2012/4/1 11:30 |
| VVOL-3 | 2012/4/1 12:30 |
| ... | ... |

| VIRTUAL VOLUME ID | RESPONSE TIME THRESHOLD | RESPONSE TIME THRESHOLD CONTINUOUS OVERRUN TOLERABLE PERIOD |
|---|---|---|
| VVOL-1 | 15ms | 300s |
| VVOL-2 | 15ms | 240s |
| VVOL-3 | 15ms | 180s |
| ... | ... | ... |

| VIRTUAL VOLUME ID | MONITORING PERIOD | RESPONSE TIME |
|---|---|---|
| VVOL-1 | 2012/4/1 10:00~10:01 | 4ms |
|  | 2012/4/1 10:01~10:02 | 4ms |
|  | 2012/4/1 10:02~10:03 | 5ms |
|  | ... | ... |
| VVOL-2 | 2012/4/1 10:00~10:01 | 4ms |
|  | ... | ... |
| ... | ... | ... |

| VIRTUAL VOLUME ID | HOST COMPUTER ID | HOST COMPUTER PORT ID | PHYSICAL STORAGE APPARATUS ID | PHYSICAL STORAGE APPARATUS PORT ID | ACCESS PATH SETTING INFORMATION |
|---|---|---|---|---|---|
| VVOL-1 | Host-1 | Host-Port11 | Storage1 | Storage-Port11 | true |
|  | Host-1 | Host-Port12 | Storage2 | Storage-Port21 | false |
|  | Host-1 | Host-Port13 | Storage3 | Storage-Port31 | false |
|  | Host-1 | Host-Port14 | Storage4 | Storage-Port41 | false |
|  | Host-1 | Host-Port15 | Storage4 | Storage-Port42 | false |
| ... | ... | ... | ... | ... | ... |
| 68A | 68B | 68C | 68D | 68E | 68F |

| PHYSICAL STORAGE APPARATUS ID | CPU BUSY RATE THRESHOLD | CACHE MEMORY UTILIZATION THRESHOLD |
|---|---|---|
| Storage-1 | 70% | 80% |
| Storage-2 | 70% | 80% |
| Storage-3 | 70% | 80% |
| ... | ... | ... |

| PHYSICAL STORAGE APPARATUS ID | MEASUREMENT DATE/TIME | CPU BUSY RATE | CACHE MEMORY UTILIZATIONz |
|---|---|---|---|
| Storage-1 | 2012/4/1 10:00 | 30% | 40% |
| | 2012/4/1 11:00 | 32% | 42% |
| | 2012/4/1 12:00 | 34% | 44% |
| | ... | ... | ... |
| Storage-2 | 2012/4/1 10:00 | 20% | 30% |
| | 2012/4/1 11:00 | 22% | 32% |
| | 2012/4/1 12:00 | 24% | 34% |
| | ... | ... | ... |
| ... | ... | ... | ... |

| ACCESS SOURCE PHYSICAL STORAGE APPARATUS ID | ACCESS DESTINATION PHYSICAL STORAGE APPARATUS ID | NUMBER OF PATHS USABLE IN DATA TRANSFER | INTER-APPARATUS COMMUNICATION MAXIMUM DATA TRAFFIC THEORETICAL VALUE |
|---|---|---|---|
| Storage-1 | Storage-2 | 1 | 500MB/s |
| | Storage-3 | 1 | 500MB/s |
| | Storage-4 | 2 | 500MB/s |
| | ... | ... | ... |
| Storage-2 | Storage-1 | 1 | 500MB/s |
| | ... | ... | ... |
| ... | ... | ... | ... |

| ACCESS SOURCE PHYSICAL STORAGE APPARATUS ID | ACCESS DESTINATION PHYSICAL STORAGE APPARATUS ID | MONITORING PERIOD | DATA TRAFFIC AVERAGE VALUE |
|---|---|---|---|
| Storage-1 | Storage-2 | 2012/4/1 10:00~10:01 | 50MB/s |
|  | Storage-3 | 2012/4/1 10:01~10:02 | 40MB/s |
|  | ... | ... | ... |
|  |  | 2012/4/1 10:00~10:01 | 30MB/s |
|  | ... | ... | ... |
| Storage-2 | Storage-1 | 2012/4/1 10:00~10:01 | 20MB/s |
|  | ... | ... | ... |
| ... | ... | ... | ... |

72

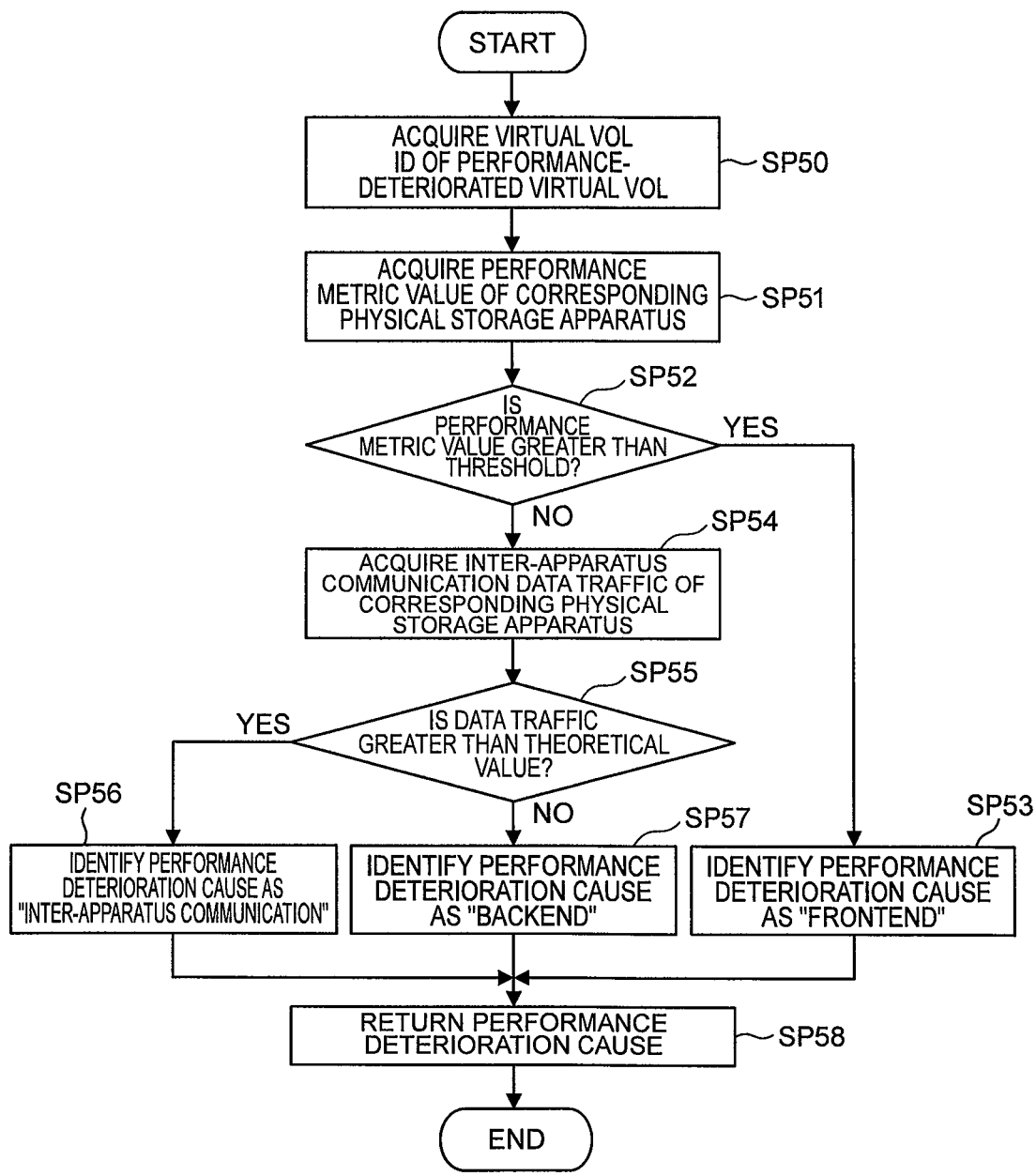

MANAGEMENT APPARATUS AND MANAGEMENT METHOD

TECHNICAL FIELD

The present invention relates to a management apparatus and a management method, and in particular relates to a management apparatus and a management method which are suitable for application to a computer system which manages a storage area provided by each of a plurality of storage apparatuses as a logical pool across the plurality of storage apparatuses, provides to a host computer a virtual volume associated with the logical pool, and dynamically assigns a storage area from the logical pool to the virtual volume.

BACKGROUND ART

In recent years, storage virtualization technology in a computer system is being broadly proposed. For example, PTL 1 discloses technology which enables a first physical storage apparatus to virtualize a logical volume of a second physical storage apparatus and provide such virtualized logical volume to a host computer as a logical volume in the own physical storage apparatus. Based on this storage virtualization technology, the storage capacity of the first physical storage apparatus can be extended by connecting the first physical storage apparatus to the second physical storage apparatus.

Meanwhile, PTL 2 discloses technology of consolidating the logical pools created in a first physical storage apparatus and a second physical storage apparatus based on the thin provisioning technique. The thin provisioning technique is the technique of a host computer dynamically assigning a storage area storing data from a logical pool according to a write request from the host computer. Based on the consolidation of the logical pools as described above, a virtual logical volume (this is hereinafter referred to as the "virtual volume") created in the second physical storage apparatus can be used as the virtual volume in the first physical storage apparatus.

Moreover, by using the technology disclosed in PTL 2, it is also possible to assign a storage area from a plurality of physical storage apparatuses to one virtual volume. In PTL 2, each physical storage apparatus manages configuration information which associates all logical pools, the respective virtual volumes associated with the respective logical pools, and unit-based physical storage areas (these are hereinafter referred to as the "physical pages") respectively configuring the respective logical pools. If the configuration information related to the logical pages is used as an identifier of the physical storage apparatus in which the respective logical pages are disposed and an address of the physical area that is being used in that physical storage apparatus, even if there are a plurality of physical storages apparatus to assign a storage area to one virtual volume, it is possible to manage the configuration information of the respective virtual volumes.

In addition, PTL 3 discloses technology of determining whether an I/O (Input/Output) request given from a host computer is directed to an own physical storage apparatus, and, when the I/O request is directed to another physical storage apparatus connected to the own physical storage apparatus, transferring that I/O request to the other physical storage apparatus.

CITATION LIST

Patent Literature

[PTL 1]
Japanese Unexamined Patent Application Publication No. 2005-107645
[PTL 2]
Japanese Unexamined Patent Application Publication (Translation of PCT Application) No. 2012-504789
[PTL 3]
Japanese Unexamined Patent Application Publication No. 2008-65561

SUMMARY OF INVENTION

Technical Problem

Meanwhile, by connecting a plurality of physical storages in parallel, building an enormous logical pool (this is hereinafter referred to as the "cross-apparatus pool") across the plurality of physical storage apparatuses, creating a virtual volume in the cross-apparatus pool, and providing the created virtual volume to a host computer, it is possible to configure a computer system capable of storing data written by the host computer into a virtual volume upon distributing the data to the plurality of physical storage apparatuses. With this kind of computer system, when the capacity of the cross-apparatus pool becomes depleted, there is an advantage in that the problem of insufficient capacity can be resolved by adding a new physical storage apparatus, and consolidating the storage of the added physical storage apparatus with the cross-apparatus pool.

In the foregoing computer system, the trigger for adding a new physical storage apparatus is not limited to the shortage of capacity of the cross-apparatus pool, and may also be when the I/O processing performance of the physical storage apparatuses configuring the cross-apparatus pool has deteriorated. In other words, when the I/O processing performance of the physical storage apparatuses configuring the cross-apparatus pool has deteriorated, the improvement of the I/O processing performance from the perspective of the overall physical storage apparatus group can be expected by distributing the I/O load of the existing physical storage apparatuses to the new physical storage apparatus.

Nevertheless, with the existing technology, there is a problem in that it is not possible to distribute the I/O load of the existing physical storage apparatus group to the newly added physical storage apparatus in a short period of time. The reason for this is because, when a new storage area is assigned to a virtual volume, the existing technology attempts to secure the storage area from a physical storage apparatus to which an access path has previously been set.

Moreover, while a method of migrating the data retained in the existing physical storage apparatuses to the newly added physical storage apparatus may also be considered, if this kind of data migration is performed unnecessarily, the physical storage apparatuses will be burdened with an additional I/O load, and there is a problem in that this may result in a temporary performance deterioration of the overall cross-apparatus pool.

Accordingly, in a computer system which provides a cross-apparatus pool, if it is possible to distribute the I/O load of the existing physical storage apparatus group to the newly added physical storage apparatus in a short period of time, it will be possible to promptly shift the physical storage apparatus group configuring the cross-apparatus pool to a steady state, and the stability and performance of the overall computer system can be consequently improved.

The present invention was devised in consideration of the foregoing points, and an object of this invention is to propose a management apparatus and a management method capable of improving the stability and performance of the overall computer system.

Solution to Problem

In the present invention for achieving the foregoing object, a storage area provided by each of a plurality of mutually connected storage apparatuses is managed as a logical pool across the plurality of storage apparatuses, a virtual volume associated with the logical pool is provided to a host computer, and, in accordance with the status of utilization of the virtual volume by the host computer, a real storage area is assigned from the logical pool to the virtual volume when [data] is written into the virtual volume from the logical pool.

The host computer is connected to the plurality of storage apparatuses via a plurality of access paths, and, with one of the paths selected among the plurality of paths as the access path, accesses the virtual volume via that access path. The storage apparatus connected to the access path transfers, in a case where an I/O request given from the host computer via the access path is not for data stored in its own storage apparatus, [the I/O request] to a storage apparatus storing data of that I/O request.

The management apparatus monitors the performance of the virtual volume, controls the host computer so that the access path to the virtual volume used by an application in which the newly assigned storage area may run short or an application which may deteriorate the access performance to the virtual volume is switched to the newly added storage apparatus, identifies the cause of performance deterioration for any virtual volume in which performance deterioration was detected after the switching of the access path to the newly added storage apparatus, and executes measures for improving the performance issue in accordance with the identified cause.

Advantageous Effects of Invention

According to the present invention, it is possible to realize a management apparatus and a management method capable of improving the stability and performance of the overall computer system.

BRIEF DESCRIPTION OF DRAWINGS

FIG. 6 is a conceptual diagram explaining the configuration of the path management table retained by the host computer.

FIG. 7 is a conceptual diagram explaining the configuration of the physical page management table.

FIG. 8 is a conceptual diagram explaining the configuration of the logical page management table.

FIG. 9 is a conceptual diagram explaining the configuration of the path management table retained by the physical storage apparatus.

FIG. 10 is a conceptual diagram explaining the configuration of the virtual storage apparatus configuration table.

FIG. 11 is a conceptual diagram explaining the configuration of the response time measurement management table.

FIG. 12 is a conceptual diagram explaining the configuration of the performance metric measurement management table.

FIG. 13 is a conceptual diagram explaining the configuration of the port performance value measurement management table.

FIG. 14 is a conceptual diagram explaining the configuration of the port management table.

FIG. 15 is a conceptual diagram explaining the configuration of the virtual storage apparatus configuration management table.

FIG. 16 is a conceptual diagram explaining the configuration of the added apparatus setting value management table.

FIG. 17 is a conceptual diagram explaining the configuration of the performance-deteriorated virtual volume management table.

FIG. 18 is a conceptual diagram explaining the configuration of the performance-deteriorated virtual volume detection date/time management table.

FIG. 19 is a conceptual diagram explaining the virtual volume performance deterioration determination condition definition table.

FIG. 20 is a conceptual diagram explaining the configuration of the virtual volume response time history table.

FIG. 21 is a conceptual diagram explaining the configuration of the path management table.

FIG. 22 is a conceptual diagram explaining the physical storage apparatus performance metric threshold definition table.

FIG. 23 is a conceptual diagram explaining the configuration of the physical storage apparatus performance metric history table.

FIG. 24 is a conceptual diagram explaining the configuration of the inter-apparatus communication performance management table.

FIG. 25 is a conceptual diagram explaining the configuration of the inter-apparatus data traffic history table.

FIG. 29 is a flowchart showing the processing routine of the performance deterioration cause identification processing.

DESCRIPTION OF EMBODIMENTS

An embodiment of the present invention is now explained in detail with reference to the drawings.

(1) Configuration of Computer System in this Embodiment

Figure 1:
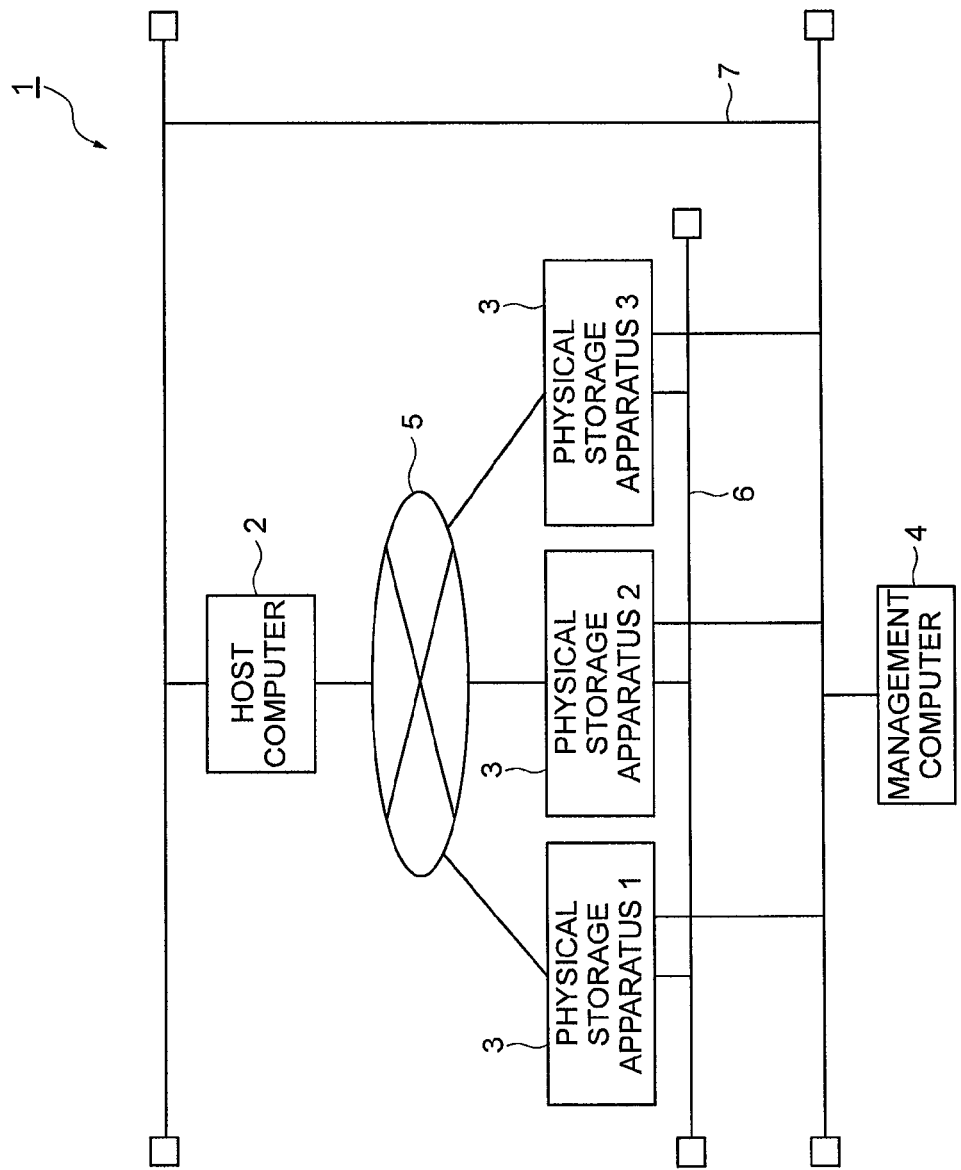
FIG. 1 is a block diagram showing the overall configuration of the computer system according to an embodiment of the present invention.

In FIG. 1, 1 shows the overall computer system according to this embodiment. The computer system 1 is configured by comprising a host computer 2, a plurality of physical storage apparatuses 3, and a management computer 4. The host computer 2 and the plurality of physical storage apparatuses 3 are connected via a host communication network 5, and the physical storage apparatuses 3 are mutually communicably connected via an inter-apparatus communication network 6. Moreover, the management computer 4 is connected to the host computer 2 and the plurality of physical storage apparatuses 3 via a management network 7.

The host communication network 5 is configured from a SAN (Storage Area Network). The host computer 2 sends and receives, via the host communication network 5, commands such as an I/O request and various types of data to and from the physical storage apparatuses 3. The inter-apparatus communication network 6 is also configured from a SAN. Each physical storage apparatus 3 transfers the I/O request from the host computer 2 to another physical storage apparatus 3 and sends and receives data to and from another physical storage apparatus 3 via the inter-apparatus communication network 6. Note that the host communication network 5 and the inter-apparatus communication network 6 may be separate networks as shown in FIG. 1, or the same network.

The management network 7 is configured from a LAN (Local Area Network). The management computer 4 collects information from the host computer 2 and the respective physical storage apparatuses 3 via the management network 7, and performs various settings to the host computer 2 and the respective physical storage apparatuses 3.

Figure 2:
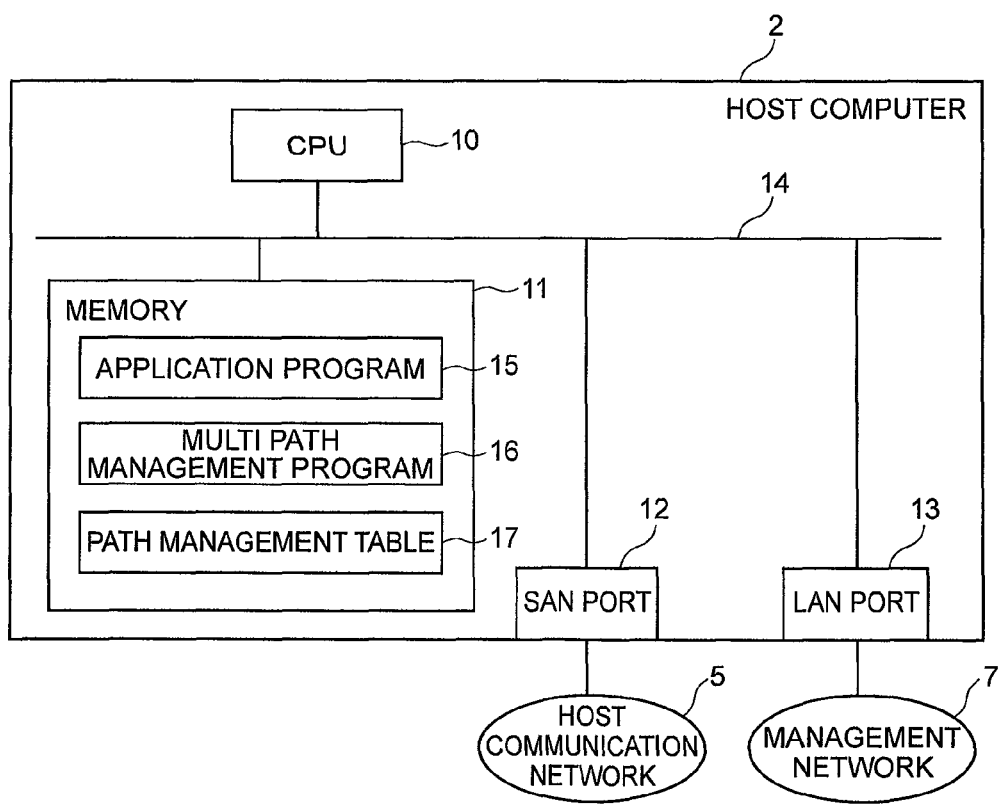
FIG. 2 is a block diagram showing the schematic configuration of the host computer.

FIG. 2 shows the schematic configuration of the host computer 2. The host computer 2 is configured by comprising a CPU (Central Processing Unit) 10 and a memory 11, one or more SAN ports 12 and LAN ports 13, and an internal bus 14 for mutually connecting the CPU 10, the memory 11, the SAN port 12 and the LAN port 13.

The CPU 10 is a processor which governs the operational control of the overall host computer 2. Moreover, the memory 11 is used for retaining various programs and various types of data. In addition to one or more application programs 15, the memory 11 additionally stores the multi path management program 16 and the path management table 17 described later.

The SAN port 12 is a port for the host communication network 5, and is given a unique network address (for example, WWN (World Wide Name)) on the host communication network 5. Moreover, the LAN port 13 is a port for the management network 7, and is given a unique network address (for example, IP (Internet Protocol address) address) on the management network 7.

Figure 3:
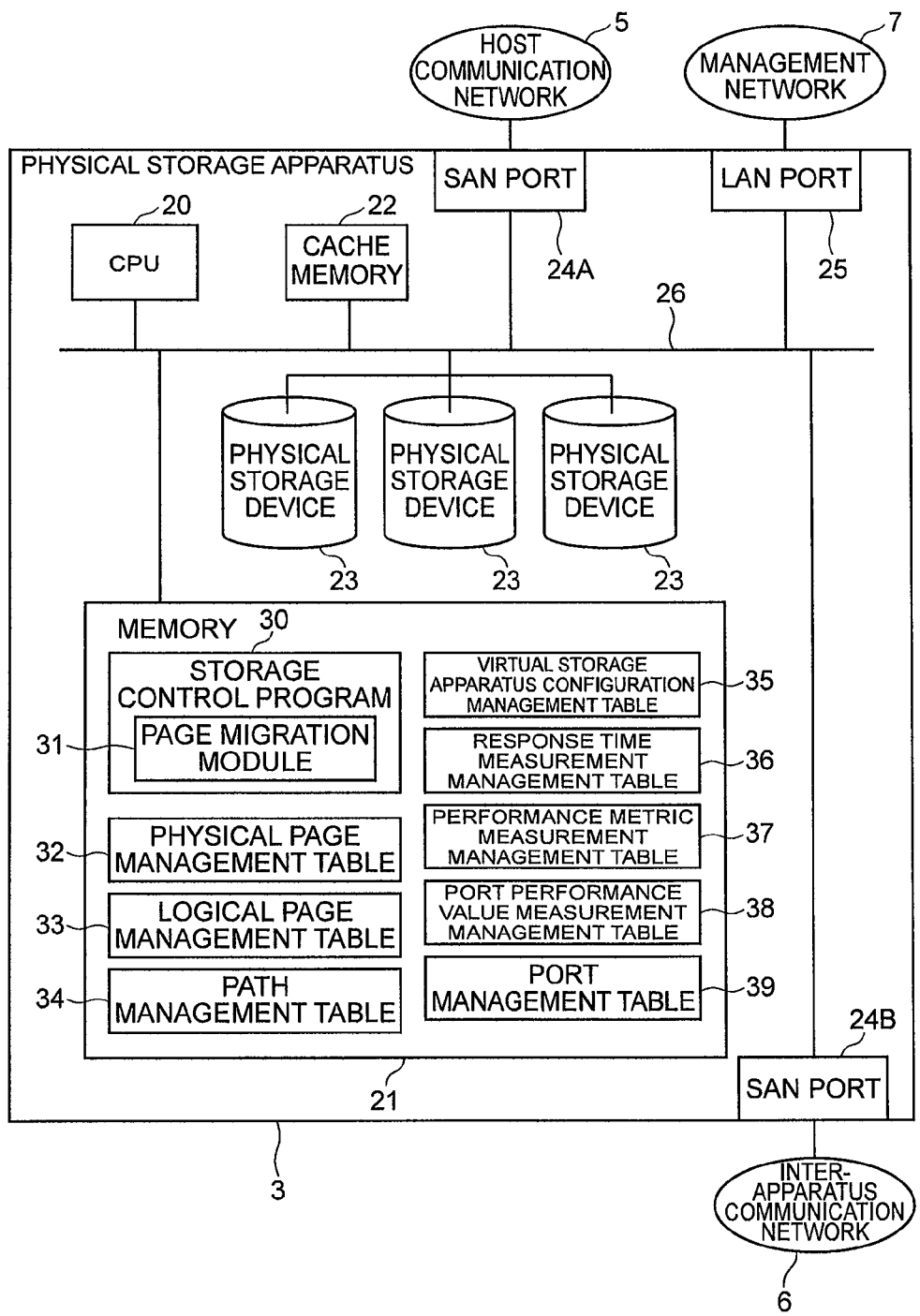
FIG. 3 is a block diagram showing the schematic configuration of the physical storage apparatus.

FIG. 3 shows the internal configuration of the physical storage apparatus 3. The physical storage apparatus 3 comprises a CPU 20, a memory 21, a cache memory 22, one or more physical storage devices 23, first and second SAN ports 24A, 24B, and a LAN port 25, and the foregoing components are mutually connected via an internal bus 26.

The CPU 20 is a processor which governs the operational control of the overall physical storage apparatus 3, reads a program stored in the physical storage device 23 into the memory 21, and executes the read program as needed.

The memory 21 is used for storing various programs read from the physical storage device 23, and also used as a work memory of the CPU 20. The storage control program 30, the physical page management table 32, the logical page management table 33, the path management table 34, the virtual storage apparatus configuration management table 35, the response time measurement management table 36, the performance metric measurement management table 37, the port performance value measurement management table 38 and the port management table 39 described later are also stored in the memory 21. However, the foregoing management tables 32 to 39 may also be retained in another auxiliary storage device. The cache memory 22 is mainly used for temporarily storing data that is read from and written into the physical storage device 23.

The first SAN port 24A is a port for the host communication network 5, and the second SAN port 24B is a port for the inter-apparatus communication network 6. In addition, the LAN port 25 is a port for the management network 7. A unique identifier (for example, WWN or IP address) on the respective networks is given to the foregoing ports.

The physical storage device 23 is configured, for example, from an expensive disk device such as a SCSI (Small Computer System Interface) disk or an inexpensive disk device such as a SATA (Serial AT Attachment) disk or an optical disk. One or more logical volumes VOL (refer to FIG. 5) are respectively set in the storage areas provided by the foregoing physical storage devices 23.

Note that the physical storage device 23 may be substituted with a RAID (Redundant Arrays of Inexpensive Disks) group. A RAID group refers to an aggregate of a plurality of storage device having similar physical characteristics such as the disk rotating speed. In the foregoing case, the CPU 20 manages the storage area provided by the plurality of physical storages devices 23 configuring one RAID group as the storage area provided by one physical storage device 23, and sets one or more logical volumes VOL on that storage area.

Figure 4:
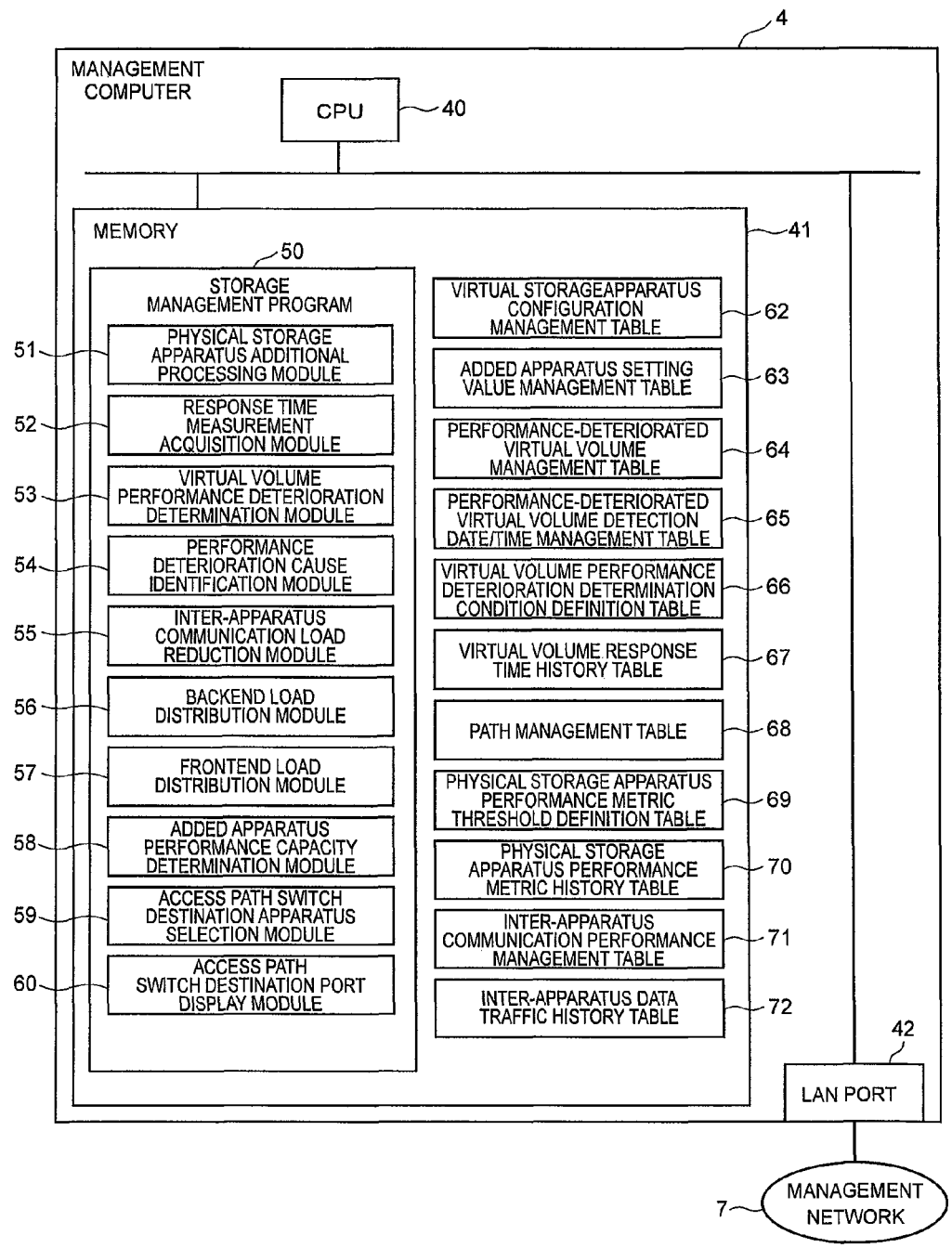
FIG. 4 is a block diagram showing the schematic configuration of the management computer.

FIG. 4 shows the schematic configuration of the management computer 4. The management computer 4 is configured by comprising a CPU 40, a memory 41 and a LAN port 42.

The CPU 40 governs the operational control of the overall management computer 4. Moreover, the memory 41 mainly stores various programs and various types of data. The memory 41 additionally stores and retains the storage management program 50 and the various management tables 62 to 72 described later. By the CPU 40 executing the storage management program 50 stored in the memory 41, the various types of processing described later are executed as the overall management computer 4. The LAN port 42 is a port for the management network 7, and is given a unique network address (for example, IP address) on the management network 7.

Figure 5:
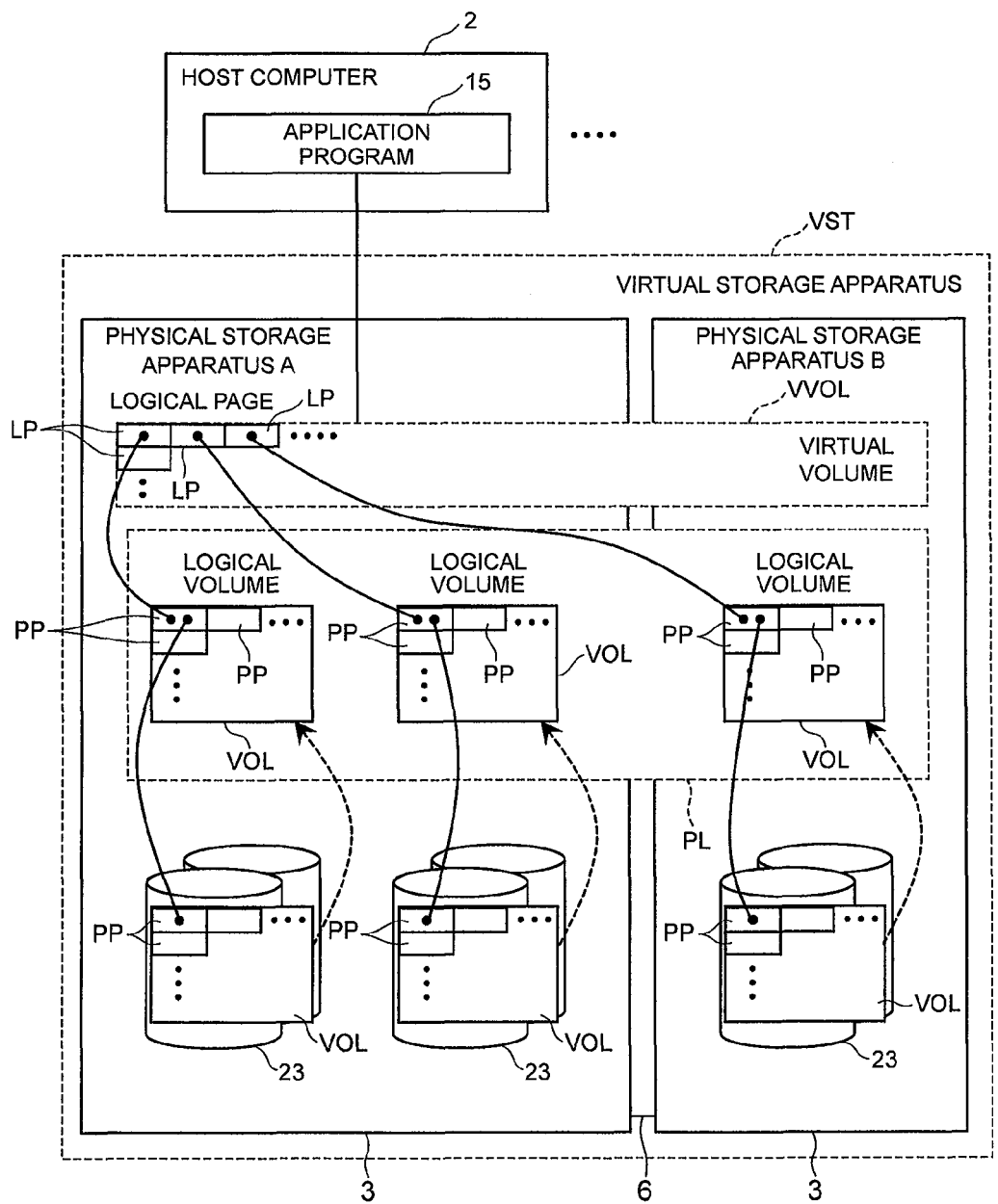
FIG. 5 is a conceptual diagram showing the logical configuration of the computer system.

FIG. 5 shows the logical configuration of the computer system 1. In the computer system 1, one virtual storage apparatus VST is created from the plurality of physical storage apparatuses 3 that are connected via the inter-apparatus communication network 6. Moreover, one or more virtual volumes VVOL across the plurality of physical storage apparatuses 3 configuring the virtual storage apparatus VST are defined in the virtual storage apparatus VST, and the virtual volume VVOL is provided to the host computer 2.

With the virtual storage apparatus VST, a logical volume VOL is created in the storage areas provided by the respective physical storage devices 23 in the respective physical storage apparatuses 3 as described above, and the logical volumes VOL in the physical storage apparatuses 3 are managed as one logical pool (cross-apparatus pool) PL across the physical storage apparatuses 3. Subsequently, a virtual volume VVOL is created in the cross-apparatus pool PL, and the virtual volume VVOL is associated with the cross-apparatus pool PL.

With the computer system 1, the host computer 2 recognizes the plurality of physical storage apparatuses 3 that are connected via the inter-apparatus communication network 6 as one virtual storage apparatus VST, and recognizes the virtual volume VVOL as the logical volume that is provided by the virtual storage apparatus VST. Here, the host computer 2 selects, as the access path, one path among the plurality of paths that are set between the plurality of physical storage apparatuses 3 configuring the virtual storage apparatus VST. Commands such as a write request and a read request and data in response to such requests are sent and received via the selected access path.

When the virtual storage apparatus VST receives, from the host computer 2, a write request for writing [data] into the virtual volume VVOL, the virtual storage apparatus VST assigns a logical storage area (this is hereinafter referred to as the "logical page") LP of a predetermined size from one of the logical volumes VOL configuring the cross-apparatus pool PL. The logical page LP is associated with a physical storage area (this is hereinafter referred to as the "physical page") PP of a predetermined size in the physical storage apparatus 3 which contains the logical volume VOL. The physical page PP is assigned to the virtual VVOL only for the required quantity according to the size of data to be written, and the target data is stored in the physical page PP.

When the physical page PP is assigned to the physical storage apparatuses 3 that are connected via the access path in response to the write request from the host computer 2, the target data is stored in that physical page PP. Meanwhile, when the physical page PP is assigned to a physical storage apparatus 3 in which the access path is not directly connected from the host computer 2, the write request is transferred, via the inter-apparatus communication network 6, from the physical storage apparatus 3 to which the access path is connected to the physical storage apparatus 3 to which the physical page PP was assigned, and stored in the physical page PP.

If data to be read exists in a physical storage apparatus 3 in which the access path is not directly connected from the host computer 2, the read request is transferred, via the inter-apparatus communication network 6, from the physical storage apparatus 3 to which the access path is connected to the physical storage apparatus 3 containing the target data. In addition, the read-target data that was read from the physical storage apparatus 3 according to the read request is sent to the physical storage apparatus 3 to which the access path is connected via the inter-apparatus communication network 6, and thereafter sent to the host computer 2 of the source of the read request via the access path.

In addition, with the computer system 1, the management computer 4 is loaded with a hierarchal data management function of controlling the respective physical storage apparatus configuring the virtual storage apparatus VST so that data having a high access frequency is migrated to a physical storage apparatus 3 to which the access path is connected, and data having a low access frequency is migrated to a physical storage apparatus 3 to which the access path is not directly connected.

The management computer 4 constantly monitors the access frequency of data retained by the respective physical storage apparatuses 3, and, when the access frequency to the data retained by a physical storage apparatus 3 to which the access path is not connected is greater than a predetermined threshold, controls that physical storage apparatus 3 to migrate that data to a physical storage apparatus 3 to which the access path is connected. Meanwhile, when the access frequency to the data retained by a physical storage apparatus 3 to which the access path is connected is less than a predetermined threshold, the management computer 4 controls the physical storage apparatus 3 to which the access path is connected to migrate that data to another physical storage apparatus 3.

Consequently, the computer system 1 can improve the response performance to the I/O request from the host computer 2 while reducing the occurrence of data transfer between the physical storage apparatuses 3.

(2) Access Path Switching Function in this Embodiment (2-1) Outline of Access Path Automatic Switching Function in this Embodiment The access path automatic switching function loaded in the management computer of the computer system 1 is now explained.

The management computer 4 is loaded with a function, upon adding a new physical storage apparatus 3 to the virtual storage apparatus VST, of automatically switching, to the new physical storage apparatus, the access path to the virtual volume VVOL used by the application which is using the virtual volume VVOL with a deteriorated performance. In order to realize the foregoing function, the management computer 4 monitors the performance of the respective virtual volumes VVOL created in the virtual storage apparatus VST and, upon detecting performance deterioration of any of the virtual volumes VVOL, and records the identifier of that virtual volume VVOL.

The virtual volume VVOL for which the access path is switched can efficiently distribute the load of the access path by switching the access path to a virtual volume VVOL having a frequency that is greater than the frequency which is predetermined based on the access frequency of the application.

For the detection of the performance deterioration of the virtual volume VVOL, used are a threshold of a metric showing the performance of the respective virtual volumes VVOL (this is hereinafter referred to as the "metric threshold"), and a period which tolerates that metric overrunning the metric threshold (this is hereinafter referred to as the "metric threshold overrun tolerable period"). When the period that the metric value of the virtual volume VVOL overran the metric threshold exceeds the metric threshold overrun tolerable period, it is determined that the performance of that virtual volume VVOL has deteriorated. In this embodiment, while a response time is used as the metric which shows the performance of the virtual volume VVOL, for instance, another index such as the throughput may also be used.

In this embodiment, once every hour, whether the performance has deteriorated is determined for all virtual volumes VVOL created in the virtual storage apparatus VST based on the history information of the response time acquired for each predetermined period (this is hereinafter referred to as the "monitoring period" and shall be 1 minute) across the past hour.

Note that it is also possible to apply an SLO (Service Level Objective) of the virtual volume VVOL as the condition for determining the performance deterioration of the virtual volume VVOL. In the foregoing case, the access path of all virtual volumes VVOL assigned to the application using the virtual volume VVOL in violation of the SLO is switched to the added physical storage apparatus 3. Here, the SLO of the virtual volume VVOL shall mean the quality of the virtual volume VVOL presented from the provider of the virtual volume VVOL to the user; specifically the target value related to the performance.

In the access path automatic switching function, as described above, after the access path is switched to the added physical storage apparatus 3, the performance of all virtual volumes VVOL in the virtual storage apparatus VST is monitored until the remaining access path capacity and the remaining storage area capacity of the added physical storage become the same level as the other existing storage apparatuses or become a predetermined level, and, if performance deterioration is detected, measures are taken in accordance with the cause of the performance deterioration.

Here, there are the following three causes that result in the performance deterioration of the virtual volume VVOL; namely, deterioration of the processing performance at the front-end of the physical storage apparatus 3 to which the access path is connected, deterioration of the data transfer performance between the physical storage apparatuses 3 via the inter-apparatus communication network 6, and deterioration of the processing performance at the back-end of any of the physical storage apparatuses 3 configuring the virtual storage apparatus VST. Based on the switching of the access path to the newly added physical storage apparatus 3 described above, even in cases where the performance of a virtual volume VVOL which is unrelated to the switching of the access path deteriorates, it is possible to improve the performance issue of that virtual volume VVOL.

As a result of adopting the setting of assigning a page, which is a real area, for storing newly written data to the storage apparatus to which the access path is set, it is possible to dispose the new data, which is likely to be referred to, in the storage apparatus to which the access path is set and, therefore, not only can the improvement in the response of the application be expected, since the added storage apparatus is likely to have sufficient unused storage capacity, this is preferable in terms of the long-term stable operation of the system which provides application services.

(2-2) Various Programs and Various Tables

As means for realizing the access path automatic switching function of this embodiment, the memory 11 of the host computer 2 stores, as shown in FIG. 2, a multi path management program 16 and a path management table 17.

The multi path management program 16 is a program for managing the paths that can be used by the application program 15 upon sending I/O requests to the virtual storage apparatus VST. This program 16 manages a plurality of paths connecting the host computer 2 and the virtual storage apparatus VST by using the path management table 17.

The path management table 17 is a table that is used by the foregoing multi path management program 16 for managing the path between the host computer 2 and the physical storage apparatus 3. The path management table 17 is configured, as shown in FIG. 6, from a host computer port ID column 17A, a physical storage apparatus ID column 17B, a physical storage apparatus port ID column 17C, a LUN column 17D and an access path setting information column 17E.

The host computer port ID column 17A stores the port ID of the respective SAN ports 12 in the local host computer connected to any of the physical storage apparatuses 3 configuring the virtual storage apparatus VST (FIG. 5) via a path associated with that entry (this is hereinafter referred to as the "corresponding path").

The physical storage apparatus ID column 17B stores the identifier (physical storage apparatus ID) of the physical storage apparatus 3 connected to the corresponding SAN port 12 via the corresponding path, and the physical storage apparatus port ID column 17C stores the port ID of the port connected to the corresponding path in that physical storage apparatus 3.

The LUN column 17D stores the identifier (LUN: Logical Unit Number) given to the storage area from which the physical page PP is assigned to the virtual volume VVOL which is accessible by the host computer 2 via the corresponding path. Specifically, for example, as shown in FIG. 5, when the cross-apparatus pool PL is configured from three logical volumes VOL and the physical page PP is assigned from these three logical volumes VOL to the virtual volume VVOL, with these three logical volumes VOL as one storage area, the identification number given to this storage area corresponds to the LUN.

The access path setting information column 17E stores information showing whether the corresponding path is the access path to the virtual volume VVOL that was associated with the path management table 17. Specifically, the access path setting information column 17E stores "true" when the corresponding path is the foregoing access path, and stores "false" when the corresponding path is not the foregoing access path.

The memory 21 of the respective physical storage apparatuses 3 stores, as shown in FIG. 3, a storage control program 30, a physical page management table 32, a logical page management table 33, a path management table 34, a virtual storage apparatus configuration management table 35, a response time measurement management table 36, a performance metric measurement management table 37, a port performance value measurement management table 38 and a port management table 39.

The storage control program 30 is a program for controlling the operation of the physical storage apparatus 3, and is configured by comprising a page migration module 31. The page migration module 31 is a module having a function of migrating, to another physical page PP in the own physical storage apparatus or another physical storage apparatus 3, data stored in the physical page PP associated with the logical page LP designated by the management computer 4 among the logical pages LP in the virtual volume VVOL.

The physical page management table 32 is a table that is used by the respective physical storage apparatuses 3 for managing the respective physical pages PP provided by the respective physical storage devices 23 in the own physical storage apparatus, and is configured, as shown in FIG. 7, from a physical storage device ID column 32A and a physical page ID column 32B.

The physical storage device ID column 32A stores the identifier (physical storage device ID) given to the respective physical storage devices 23 mounted on that physical storage apparatus 3. Moreover, the physical page ID column 32B stores the identifier (physical page ID) given to the respective physical pages PP included in the storage area provided by the corresponding physical storage device 23.

Moreover, the logical page management table 33 is a common table that is retained by the respective physical storage apparatuses 3 configuring the virtual storage apparatus VST, and is used for managing the respective logical pages LP in the respective virtual volumes VVOL created in that virtual storage apparatus VST. The logical page management table 33 is configured, as shown in FIG. 8, from a virtual volume ID column 33A, a logical page ID column 33B, a physical storage apparatus ID column 33C and a physical page ID column 33D.

In addition, the virtual volume ID column 33A stores the identifier (virtual volume ID) given to the respective virtual volumes VVOL which were set in that virtual storage apparatus VST, and the logical page ID column 33B stores the identifier (logical page ID) given to the respective logical pages LP in the corresponding virtual volume VVOL.

Moreover, the physical page ID column 33D stores the physical page ID of the physical page PP assigned to the corresponding logical page LP from the cross-apparatus pool PL of the virtual storage apparatus VST, and the physical storage apparatus ID column 33C stores the physical storage apparatus ID of the physical storage apparatus 3 which is providing that physical page PP.

In addition, the path management table 34 is a common table that is retained by the respective physical storage apparatuses 3 configuring the virtual storage apparatus VST, and is used for managing the access path to be used by the host computer 2 upon accessing the respective virtual volumes VVOL in the virtual storage apparatus VST. The path management table 34 is configured, as shown in FIG. 9, from a virtual volume ID column 34A, a LUN column 34B, a physical storage apparatus-side port ID column 34C and a host computer-side port ID column 34D.

In addition, the virtual volume ID column 34A stores the virtual volume ID of the respective virtual volumes VVOL created in the virtual storage apparatus VST, and the LUN column 34B stores the LUN given to the storage area in the virtual storage apparatus VST (FIG. 5) which provides the physical page PP (FIG. 5) to the corresponding virtual volume VVOL.

Moreover, the physical storage apparatus-side port ID column 34C stores the identifier (port ID) given to the SAN ports 24A, 24B (FIG. 3) of the physical storage apparatus 3 to which the corresponding virtual volume VVOL is connected, and the host computer port ID column 34D stores the port ID given to the SAN port 12 (FIG. 2) of the host computer 2 connected to that virtual volume VVOL.

The virtual storage apparatus configuration management table 35 is a common table that is retained by the respective physical storage apparatuses 3 configuring the virtual storage apparatus VST, and is used for managing the physical storage apparatuses 3 configuring that virtual storage apparatus VST. The virtual storage apparatus configuration management table 35 is configured, as shown in FIG. 10, from a physical storage apparatus ID column 35A. The physical storage apparatus ID column 35A stores the physical storage apparatus ID of all physical storage apparatuses 3 configuring the corresponding virtual storage apparatus VST.

The response time measurement management table 36 is a table that is retained by the respective physical storage apparatuses 3 configuring the virtual storage apparatus VST, and is used for managing the measurement of the response time to the respective virtual volumes VVOL. The response time measurement management table 36 is configured, as shown in FIG. 11, from a virtual volume ID column 36A, an I/O count column 36B and an average response time column 36C.

In addition, the virtual volume ID column 36A stores the virtual volume ID of the respective virtual volumes VVOL created in the virtual storage apparatus VST, and the I/O count column 36B stores the number of I/Os to the virtual volume VVOL which is measured by that physical storage apparatus 3 for a 1-minute period (monitoring period). Moreover, the average response time column 36C stores the average value (average response time) of the response time to the individual I/O requests which is measured by the physical storage apparatus 3 for a 1-minute period (monitoring period) regarding that virtual volume VVOL.

Note that, since the average response time and the number of I/Os which are measured by the physical storage apparatus 3 regarding the respective virtual volumes VVOL are in monitoring period (1-minute) units, the response time measurement management table 36 is also updated every minute.

The performance metric measurement management table 37 is a table that is retained by the respective physical storage apparatuses 3 configuring the virtual storage apparatus VST, and is used for managing the performance metric (CPU busy rate and cache memory utilization) of the own physical storage apparatus that is measured for a 1-minute period (monitoring period). The performance metric measurement management table 37 is configured, as shown in FIG. 12, from a CPU busy rate average value column 37A and a cache memory utilization average value column 37B.

In addition, the CPU busy rate average value column 37A stores the average value of the temporal ratio that the CPU 20 (FIG. 3) in the own physical storage apparatus became busy during the 1-minute monitoring period (this is hereinafter referred to as the "CPU busy rate average value"), and the cache memory utilization average value column stores the average value (this is hereinafter referred to as the "cache memory utilization average value") of the utilization of the cache memory 22 (FIG. 3) in the own physical storage apparatus (ratio of the used capacity relative to the overall capacity of the cache memory) during the 1-minute monitoring period.

Note that, since the CPU busy rate average value and the cache memory utilization average value which are calculated by the physical storage apparatus 3 are in monitoring period (1-minute) units, the performance metric measurement management table 37 is also updated every minute.

The port performance value measurement management table 38 is a table that is retained by the respective physical storage apparatuses 3 configuring the virtual storage apparatus VST, and is used for managing the measurement of the performance value of the respective SAN ports 24A, 24B (FIG. 3) in the own physical storage apparatus which is measured for a 1-minute period (monitoring period). The port performance value measurement management table 38 is configured, as shown in FIG. 13, from a port ID column 38A, a destination node ID column 38B, a destination port ID column 38C and a data traffic average value column 38D.

In addition, the port ID column 38A stores the port ID given to the respective SAN ports 24A, 24B in the physical storage apparatus 3 retaining the port performance value measurement management table 38, and the destination node ID column 38B stores the identifier given to the node (physical storage apparatus 3 or host computer 2) connected to the corresponding SAN ports 24A, 24B.

Moreover, the destination port ID column 38C stores the port ID of the SAN port in the node connected to the corresponding SAN ports 24A, 24B in that physical storage apparatus 3, and the data traffic average value column 38D stores the average value of the data traffic per unit time (1 second) that data is transferred from the corresponding SAN ports 24A, 24B in that physical storage apparatus 3 to the corresponding node which is measured for a 1-minute period (monitoring period).

Note that, since the average value of data traffic calculated by the physical storage apparatus 3 is in monitoring period (1-minute) units, the port performance value measurement management table 38 is also updated every minute.

In addition, the port management table 39 is a table that is retained by the respective physical storage apparatuses 3 configuring the virtual storage apparatus VST, and is used for managing the respective SAN ports 24A, 24B in the own physical storage apparatus. The port management table 39 is configured, as shown in FIG. 14, from a port ID column 39A, a port type column 39B and a maximum data traffic theoretical value column 39C.

In addition, the port ID column 39A stores the port ID of all SAN ports 24A, 24B existing in that physical storage apparatus 3, and the port type column 39B stores the type (for example, 4 Gbps-FC (Fibre Channel) port) of the corresponding SAN ports 24A, 24B. Furthermore, the maximum data traffic theoretical value column 39C stores the theoretical value of the maximum data amount that can be transferred per unit time (1 second) of the corresponding SAN ports 24A, 24B. Note that this theoretical value is a unique value that depends on the port type of the corresponding SAN ports 24A, 24B.

Meanwhile, the memory 41 of the management computer 4 stores, as means for realizing the foregoing access path automatic switching function, as shown in FIG. 4, a storage management program 50, a virtual storage apparatus configuration management table 62, an added apparatus setting value management table 63, a performance-deteriorated virtual volume management table 64, a performance-deteriorated virtual volume detection date/time management table 65, a virtual volume performance deterioration determination condition definition table 66, a virtual volume response time history table 67, a path management table 68, a physical storage apparatus performance metric threshold definition table 69, a physical storage apparatus performance metric history table 70, an inter-apparatus communication performance management table 71 and an inter-apparatus data traffic history table 72.

The storage management program 50 is a program that is used by the management computer 4 for managing the physical storage apparatuses 3 in the computer system 1, and is configured by comprising a physical storage apparatus additional processing module 51, a response time module measurement acquisition module 52, a virtual volume performance deterioration determination module 53, a performance deterioration cause identification module 54, an inter-apparatus communication load reduction module 55, a back-end load balancing module 56, a front-end load balancing module 57, an added apparatus performance capacity determination module 58, an access path switch destination apparatus selection module 59 and an access path switch destination port display module 60.

Among the above, the physical storage apparatus additional processing module 51 is a module for registering, when a physical storage apparatus 3 is newly added, information related to that physical storage apparatus 3 in the added apparatus setting value management table 63 (FIG. 16) described later, and the response time module measurement acquisition module 52 is a module for acquiring, for each monitoring period, the number of I/Os of the respective virtual volume VVOL which is measured by the respective physical storage apparatuses 3 configuring the virtual storage apparatus VST and the average value of the response time (this is hereinafter referred to as the "average response time"), and storing the obtained number of I/Os and the respective average values of the average response time in the virtual volume response time history table 67 (FIG. 20) described later.

The virtual volume performance deterioration determination module 53 is a module for determining whether the performance of the respective virtual volumes VVOL created in the virtual storage apparatus VST is deteriorating, and the performance deterioration cause identification module 54 is a module for identifying, when the virtual volume performance deterioration determination module 53 determines that the performance of a certain virtual volume VVOL is deteriorating, the cause of performance deterioration of that virtual volume VVOL.

The inter-apparatus communication load reduction module 55 is a module for performing, when the virtual volume performance deterioration determination module 53 determines that the cause of performance deterioration of the virtual volume VVOL is a result of the increase in data traffic in the inter-apparatus communication path connecting the physical storage apparatuses 3, predetermined processing for improving the performance of that virtual volume VVOL.

Moreover, the back-end load balancing module 56 is a module for performing, when the virtual volume performance deterioration determination module 53 determines that the cause of performance deterioration of the virtual volume VVOL is a result of the increase in load of the back-end of the physical storage apparatus 3 caused by the concentration of I/O requests to a specific physical storage device 23 (FIG. 3), predetermined processing for improving the performance of that virtual volume VVOL. Note that the "back-end" of the physical storage apparatus 3 refers to the portion that processes the I/O request to the physical storage device 23 in the physical storage apparatus 3 and, for example, corresponds to the physical storage device 23 and the portion configured from the processor (not shown) and the like for processing the I/Os to that physical storage device 23.

Similarly, the front-end load balancing module 57 is a module for performing, when the virtual volume performance deterioration determination module 53 determines that the cause of performance deterioration of the virtual volume VVOL is a result of the increase in load of the front-end of the physical storage apparatus 3 to which the access path is connected caused by the concentration of I/O requests from the host computer or another physical storage apparatus 3, predetermined processing for improving the performance of that virtual volume VVOL. Note that the "front-end" of the physical storage apparatus 3 refers to the portion that processes the I/O requests from the host computer 2 or another physical storage apparatus 3 and, for example, corresponds to the processor (port processor) and the cache memory 22 of the SAN ports 24A, 24B and the like.

Note that the added apparatus performance capacity determination module 58, the access path switch destination apparatus selection module 59 and the access path switch destination port display module 60 will be described in detail later.

Meanwhile, the virtual storage apparatus configuration management table 62 is a table that is used for managing the physical storage apparatuses 3 configuring the virtual storage apparatus VST, and stores, as shown in FIG. 15, with respect to the individual physical storage apparatuses 3, information showing whether the determination result on whether the physical storage apparatus 3 is an added physical storage apparatus, and information showing whether the setting of balancing the capacity consumption has been adopted. Note that the balancing of the capacity consumption refers to the migration of data between the physical storage devices, when a plurality of physical storages devices 23 are mounted on the physical storage apparatus 3, so that the ratio of the amount of data stored in the respective physical storage devices 23 becomes the same ratio as the ratio of the storage capacity of that physical storage device 23.

The added apparatus setting value management table 63 is a table that is used for managing the performance reference value regarding whether the added physical storage apparatus 3 can be recognized as an "added physical storage apparatus" and stores, as shown in FIG. 16, with respect to the physical storage apparatus 3 which was determined as having been added, the limit value of the CPU busy rate where that physical storage apparatus 3 may be determined an "added physical storage apparatus" (this is hereinafter referred to as the "CPU busy rate setting value"), the limit value of utilization of the cache memory 22 (this is hereinafter referred to as the "cache memory utilization setting value"), and the limit value of capacity consumption (this is hereinafter referred to as the "capacity consumption setting value").

The performance-deteriorated virtual volume management table 64 is a table that is used for managing the performance status of the respective virtual volumes VVOL created in the virtual storage apparatus VST and is configured, as shown in FIG. 17, from a virtual volume ID column 64A, a performance deterioration information column 64B, a response time threshold continuous overrun period column 64C and an access path automatic switching setting information column 64D.

The virtual volume ID column 64A stores the virtual volume ID of all virtual volumes VVOL created in the corresponding virtual storage apparatus VST, and the performance deterioration information column 64B stores "true" when the performance of the corresponding virtual volume VVOL is deteriorating, and stores "false" when the performance is not deteriorating.

The response time threshold continuous overrun period column 64C stores the time that the response time of the I/O request to the corresponding virtual volume VVOL overran the predetermined response time threshold (this is hereinafter referred to as the "response time threshold continuous overrun period"), and the access path automatic switching setting information column 64D stores "true" when the setting for automatically switching the access path has been adopted (this is hereinafter referred to as the "access path automatic switching setting"), and stores "false" when such a setting has not been adopted.

The performance-deteriorated virtual volume detection date/time management table 65 is a table that is used for managing the date/time in which the virtual volume VVOL with a deteriorated performance was detected and is configured, as shown in FIG. 18, from a virtual volume ID column 65A and a performance deterioration detection date/time column 65B.

The virtual volume ID column 65A stores the virtual volume ID of the virtual volume VVOL in which the performance was determined as having deteriorated, and the performance deterioration detection date/time column 65B stores the date/time in which the performance deterioration of that virtual volume VVOL was detected.

The virtual volume performance deterioration determination condition definition table 66 is a table that is used for managing the determination criteria, which is set for the individual virtual volumes VVOL in the virtual storage apparatus VST, upon determining the performance deterioration of that virtual volume VVOL, and is configured, as shown in FIG. 19, from a virtual volume ID column 66A, a response time threshold column 66B and a response time threshold continuous overrun tolerable period column 66C.

The virtual volume ID column 66A stores the virtual volume ID of the respective virtual volumes VVOL created in the virtual storage apparatus VST. Moreover, the response time threshold column 66B stores the threshold of the response time that was set regarding the corresponding virtual volume VVOL (this is hereinafter referred to as the "response time threshold"), and the response time threshold continuous overrun tolerable period column 66C stores the threshold of the response time threshold continuous overrun period which tolerates the continuous overrun of the response time threshold that was set for that virtual volume VVOL (this is hereinafter referred to as the "response time threshold continuous overrun tolerable period").

The virtual volume response time history table 67 is a table that is used for storing and managing the average value of the response time collected from the respective physical storage apparatus 3 for each monitoring period described above regarding the respective virtual volumes VVOL created in the virtual storage apparatus VST, and is configured, as shown in FIG. 20, from a virtual volume ID column 67A, a monitoring period column 67B, and a response time column 67C.

The virtual volume ID column 67A stores the virtual volume ID of the individual virtual volumes VVOL created in the virtual storage apparatus VST, and the monitoring period column 67B stores the information showing the respective monitoring periods in which the response time of the corresponding virtual volume VVOL was monitored. Moreover, the response time column 67C stores the average response time of the corresponding virtual volume VVOL in the corresponding monitoring period.

The path management table 68 is a table that is used for managing the path between the respective virtual volumes VVOL in the virtual storage apparatus VST and the host computer 2, and is configured, as shown in FIG. 21, from a virtual volume ID column 68A, a host computer ID column 68B, a host computer port ID column 68C, a physical storage apparatus ID column 68D, a physical storage apparatus ID column 68E and an access path setting information column 68F.

The virtual volume ID column 68A stores the virtual volume ID of the respective virtual volumes VVOL created in the virtual storage apparatus VST. Moreover, the host computer ID column 68B stores the host computer ID of the respective host computers 2 connected to that virtual volume VVOL, and the host computer port ID column 68C stores the port ID of the SAN port 12 (FIG. 2) connected to the corresponding virtual volume VVOL in the corresponding host computer 2.

In addition, the physical storage apparatus ID column 68E stores the physical storage apparatus ID of the physical storage apparatus 3 connected to the corresponding SAN port 12 of the corresponding host computer 2 among the physical storage apparatuses 3 configuring the virtual storage apparatus VST, and the physical storage apparatus port ID column 68E stores the port ID of the corresponding SAN port 24A (FIG. 3) in the corresponding physical storage apparatus 3 connected to the corresponding SAN port 12 of the corresponding host computer 2.

In addition, the access path setting information column 68F stores "true" when the path connecting the corresponding SAN port 12 in the corresponding host computer 2 and the corresponding SAN port 24A in the corresponding physical storage apparatus 3 is set as the access path when the host computer 2 is to access the virtual storage apparatus VST, and stores "false" when it is not set as such access path.

The physical storage apparatus performance metric threshold definition table 69 is a table that is used for managing the threshold of the performance metric, which is set for the individual physical storage apparatuses 3 configuring the virtual storage apparatus VST, of that physical storage apparatus 3, and is configured, as shown in FIG. 22, from a physical storage apparatus ID column 69A, a CPU busy rate threshold column 69B and a cache memory utilization threshold column 69C.

The physical storage apparatus ID column 69A stores the physical storage apparatus ID of the respective physical storage apparatuses 3 configuring the virtual storage apparatus VST. Moreover, the CPU busy rate threshold column 69B stores the CPU busy rate threshold to be used for determining that the load of that physical storage apparatus 3 is excessive based on the CPU busy rate acquired during each of the foregoing monitoring periods. In addition, the cache memory utilization threshold column 69C stores the cache memory utilization threshold to be used for determining that the load of that physical storage apparatus 3 is excessive based on the cache memory utilization acquired during the foregoing monitoring period.

The physical storage apparatus performance metric history table 70 is a table that is used for managing the CPU busy rate and the cache memory utilization that were sequentially acquired for each monitoring period described above regarding the respective physical storage apparatuses 3 configuring the virtual storage apparatus VST, and is configured, as shown in FIG. 23, from a physical storage apparatus ID column 70A, a measurement date/time column 70B, a CPU busy rate column 70C and a cache memory utilization column 70D.

The physical storage apparatus ID column 70A stores the physical storage apparatus ID of the respective physical storage apparatuses 3 configuring the virtual storage apparatus VST, and the measurement date/time column 70B sequentially stores all dates/times, in order from the oldest date/time, when the performance metric was measured regarding the corresponding physical storage apparatus 3.

Moreover, the CPU busy rate column 70C stores the CPU busy rate that was measured on the corresponding measurement date/time regarding the corresponding physical storage apparatus 3, and the cache memory utilization column 70D stores the cache memory utilization that was measured on the corresponding measurement date/time regarding the corresponding physical storage apparatus 3.

Note that the physical storage apparatus performance metric history table 70 is updated every monitoring period (1 minute) by the storage management program 50.

The inter-apparatus communication performance management table 71 is a table that is used for managing the communication performance between the respective physical storage apparatuses 3 configuring the virtual storage apparatus VST, and stores, as shown in FIG. 24, the number of paths that can be used for the data transfer between the respective physical storage apparatuses 3, and the logical value of the maximum data traffic in the inter-apparatus communication.

The inter-apparatus data traffic history table 72 is a table that is used for managing the history of the data traffic of inter-apparatus communication and stores, as shown in FIG. 25, the average value of data traffic for each monitoring period between the respective physical storage apparatuses 3.

(2-3) Various Types of Processing Related to Access Path Automatic Switching Processing The specific processing contents of the various types of processing which are performed in relation to the foregoing access path automatic switching function are now explained. Note that, in the ensuing explanation, while the processing subject of the various types of processing is explained as a "program" or a "module", it goes without saying that, in reality, the CPU 20 (FIG. 3) of the physical storage apparatus 3 or the CPU 40 (FIG. 4) of the management computer 4 performs such processing based on the program or the module.

(2-3-1) Physical Storage Apparatus Addition Processing

The physical storage apparatus additional processing module 51 refers to the performance-deteriorated virtual volume management table 64, and acquires a list of virtual volumes subject to performance deterioration. Subsequently, the physical storage apparatus additional processing module 51 refers to a corresponding table (not shown) of the virtual volumes VVOL and the application program 15 (FIG. 2) of the management computer 4, and associates the respective virtual volumes VVOL subject to performance deterioration and the application program 15 using those virtual volumes VVOL. In addition, the physical storage apparatus additional processing module 51 refers to the corresponding table and acquires a list of all virtual volumes that are being used by the application.

Subsequently, the physical storage apparatus additional processing module 51 acquires, from the path management table 68, the alternative paths that can be used as the access path to all virtual volumes VVOL being used by the application program 15 using the performance-deteriorated virtual volumes VVOL. A command for switching the access path to the alternative path is given to the host computer 2 loaded with the respective application programs 15.

Consequently, the module 51 instructs the host computer 2 to switch, to the physical storage apparatus 3 to be added, the access path to the virtual volumes VVOL being used by the application program 15 using the performance-deteriorated virtual volumes VVOL in the virtual storage apparatus VST. Here, the contents of the path management table 68 (FIG. 21) are updated pursuant to the switching of the access path.

The host computer 2 that received the foregoing command updates the corresponding path management table 17 (FIG. 6) stored in the memory 11 (FIG. 2) so as to switch the access path to the virtual storage apparatus VST to the physical storage apparatus 3 to be added.

(2-3-2) Response Time Measurement Acquisition Processing

Figure 26:
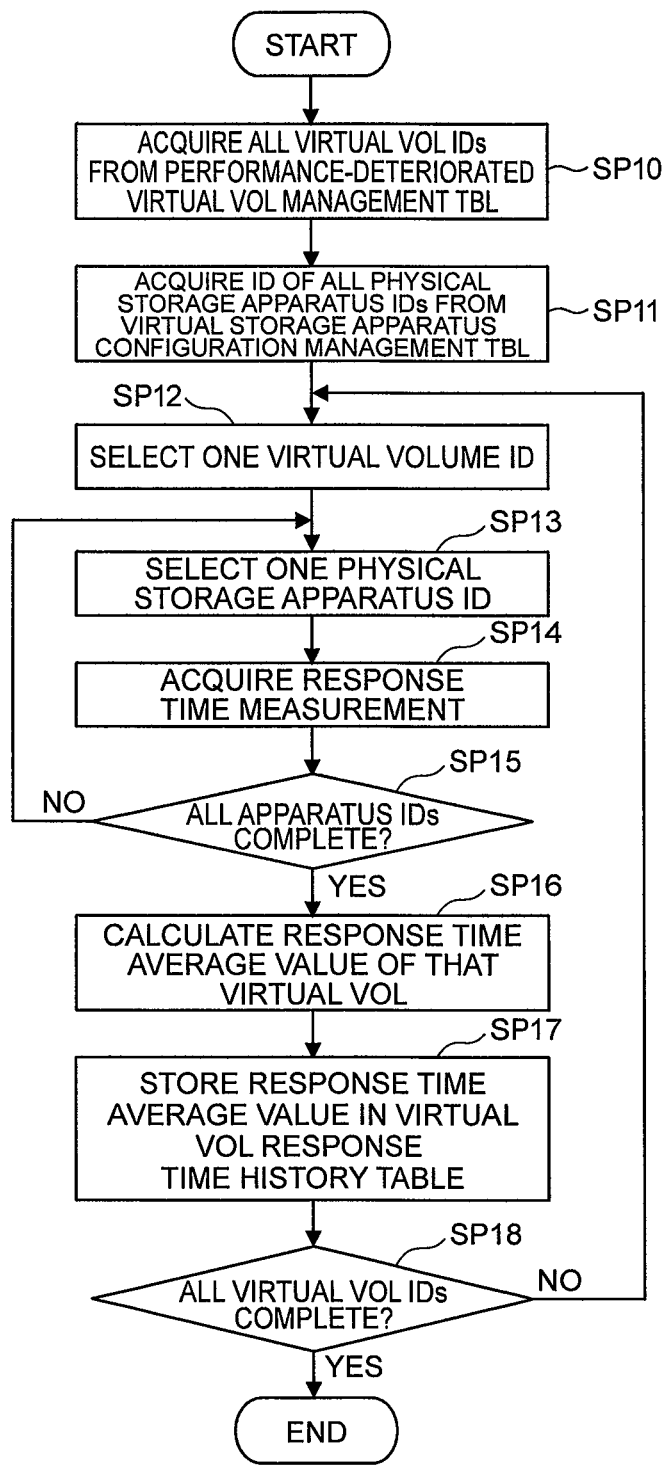
FIG. 26 is a flowchart showing the processing routine of the response time measurement acquisition processing.

Meanwhile, FIG. 26 shows the processing routine of the response time measurement acquisition processing to be performed by the response time module measurement acquisition module 52 (FIG. 4) of the management computer for each monitoring period (1-minute period). The response time module measurement acquisition module 52 acquires the average value of the response time for each monitoring period of the respective virtual volumes VVOL created in the virtual storage apparatus VST according to the processing routine shown in FIG. 26, and registers the acquired average value in the virtual volume response time history table 67 (FIG. 20).

In actuality, when the response time module measurement acquisition module 52 starts the response time measurement acquisition processing, foremost, the virtual volume ID of all virtual volumes VVOL created in the virtual storage apparatus VST is acquired from the performance-deteriorated virtual volume management table 64 (FIG. 17) (SP10).

Subsequently, the response time module measurement acquisition module 52 acquires, from the virtual storage apparatus configuration management table 62 (FIG. 15), the physical storage apparatus ID of all physical storage apparatuses 3 configuring the virtual storage apparatus VST (SP11).

Subsequently, the response time module measurement acquisition module 52 selects the virtual volume ID of one virtual volume VVOL among the virtual volume IDs acquired in step SP10 (SP12). In addition, the response time module measurement acquisition module 52 acquires the physical storage apparatus ID of one physical storage apparatus 3 among the physical storage apparatus IDs acquired in step SP11 (SP13).

Thereafter, the response time module measurement acquisition module 52 sends, to the physical storage apparatus (this is hereinafter referred to as the "selected physical storage apparatus") 3 having the physical storage apparatus ID selected in step SP13, a response time measurement transfer request for requesting the transfer of the measurement of the response time regarding the virtual volume (this is hereinafter referred to as the "selected virtual volume") VVOL having the virtual volume ID selected in step SP12 (SP14).

Consequently, the CPU 20 (FIG. 3) of the physical storage apparatus 3 that received the response time measurement transfer request reads, from the response time measurement management table 36 (FIG. 11), the number of I/Os and the average response time of the virtual volume VVOL having the virtual volume ID designated in the response time measurement transfer request, and transfers these to the management computer 4.

Subsequently, the response time module measurement acquisition module 52 determines whether the processing of step SP13 and step SP14 is complete for all physical storage apparatus IDs acquired in step SP11 (SP15).

When the response time module measurement acquisition module 52 obtains a negative result in the foregoing determination, it returns to step S13P and thereafter repeats the processing of step SP13 to step SP15 while sequentially switching the physical storage apparatus ID to be selected in step SP13 to another unprocessed physical storage apparatus ID.

Subsequently, when the response time module measurement acquisition module 52 obtains a positive result in step SP15 as a result of eventually acquiring the number of I/Os and the average response time of the selected virtual volume VVOL from all physical storage apparatus 3 having the respective physical storage apparatus IDs acquired in step SP11, it calculates the average value of the average response time of the selected virtual volume VVOL (this is hereinafter referred to as the "response time average value") (SP16).

Specifically, the response time module measurement acquisition module 52 calculates the response time average value R of the selected virtual volume VVOL based on the following formula with the average response time acquired at the i-th time as $r_i$, and the number of I/Os acquired at the same i-th time as $N_i$.

[Math 1]
$$R = \frac{\sum (r_i \times N_i)}{\sum (N_i)} \quad (1)$$

Note that, as shown in Formula (I) above, the reason why the response time average value R of the selected virtual volume VVOL was calculated as the weighted average based on the number of I/Os $N_1$ of the average response time acquired in the respective physical storage apparatuses 3 is in light of the fact that there is a possibility that the physical storage apparatus 3 connected to the selected virtual volume VVOL via the access path could be switched to another physical storage apparatus 3 during the performance period of the response time measurement acquisition processing.

Thereafter, the response time module measurement acquisition module 52 registers, in the virtual volume response time history table 67 (FIG. 20), the response time average value R of the selected virtual volume VVOL calculated in step SP16 (SP17). Specifically, the response time module measurement acquisition module 52 secures the entry corresponding to the selected virtual volume VVOL in the virtual volume response time history table 67, stores the date/time showing the monitoring period of that time in the monitoring period column 67B (FIG. 20) of that entry, and additionally stores the response time average value R calculated in step SP16 in the response time column 67C (FIG. 20) of that entry.

Subsequently, the response time module measurement acquisition module 52 determines whether the processing of step SP11 to step SP17 is complete regarding all virtual volume IDs acquired in step SP10 (SP18).

When the response time module measurement acquisition module 52 obtains a negative result in the foregoing determination, it returns to step SP12 and thereafter repeats the processing of step SP12 to step SP18 while sequentially switching the virtual volume ID to be selected in step SP12 to another unprocessed virtual volume ID.

Subsequently, when the response time module measurement acquisition module 52 obtains a positive result in step SP18 as a result of eventually registering, in the virtual volume response time history table 67, the response time average value during the same monitoring period regarding the respective virtual volume IDs acquired in step SP10, it ends the response time measurement acquisition processing.

Figure 27:
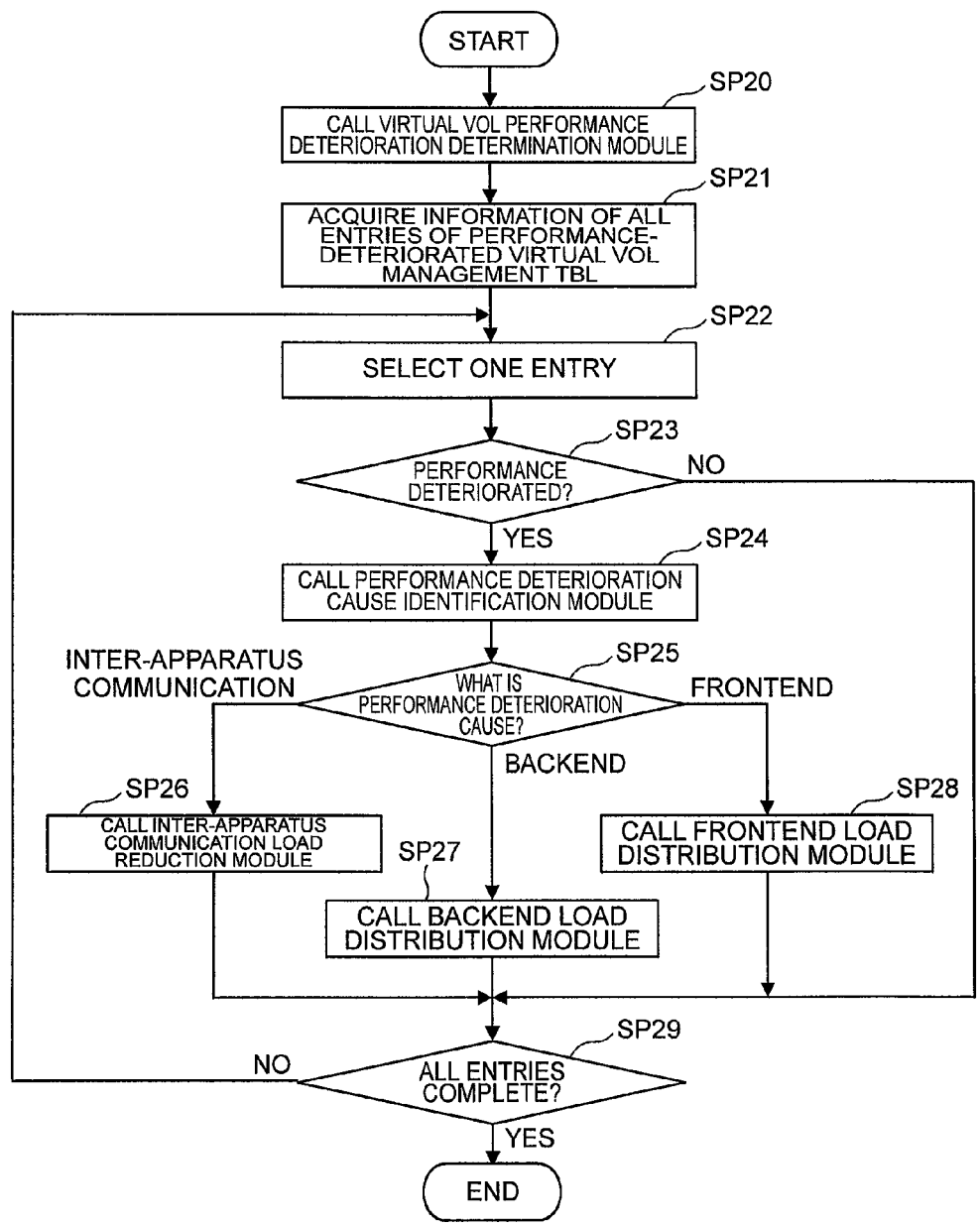
FIG. 27 is a flowchart showing the processing routine of the storage management processing.

(2-3-3) Various Types of Processing Related to Storage Management (2-3-3-1) Storage Management Processing Meanwhile, FIG. 27 shows the processing routine of the storage management processing that is periodically (for instance, every hour) by the storage management program 50 (FIG. 4). The storage management program 50 determines the existence of a virtual volume VVOL with a deteriorated performance according to the processing routine shown in FIG. 27, and, if there is a virtual volume VVOL with a deteriorated performance, distributes the load of that virtual volume VVOL.

In actuality, when the storage management program 50 starts the storage management processing, foremost, it calls the virtual volume performance deterioration determination module 53 (FIG. 4). Subsequently, the virtual volume performance deterioration determination module 53 that was called by the storage management program 50 performs the virtual volume performance deterioration determination processing of determining whether the performance of the respective virtual volumes VVOL created in the virtual storage apparatus VST is deteriorating (SP20).

Subsequently, the storage management program 50 reads the information of all entries from the performance-deteriorated virtual volume management table 64 (FIG. 17) (SP21), and selects one entry among all entries for which information was read (SP22). The storage management program 50 thereafter determines whether the value stored in the performance deterioration information column 64B (FIG. 17) of the entry selected in step SP22 is "true" (SP23).

When the storage management program 50 obtains a negative result in the foregoing determination, it proceeds to step SP29. Meanwhile, when the storage management program 50 obtains a positive result in the determination of step SP23, it respectively registers, in the corresponding virtual volume ID column 65A or the performance deterioration detection date/time column 65B of the performance-deteriorated virtual volume detection date/time management table 65 (FIG. 18), the virtual volume ID of the virtual volume VVOL corresponding to the entry selected in step SP22 and the current date/time. Moreover, the storage management program 50 simultaneously calls the performance deterioration cause identification module 54 and causes the performance deterioration cause identification module 54 to perform the performance deterioration cause identification processing of identifying the cause that deteriorated the performance of the corresponding virtual volume VVOL (SP24).

Subsequently, the storage management program 50 calls the inter-apparatus communication load reduction module 55 (FIG. 4) when the cause of performance deterioration identified in the performance deterioration cause identification processing of step SP24 is "inter-apparatus communication", and causes the inter-apparatus communication load reduction module 55 to perform the inter-apparatus communication load reduction processing of migrating all data stored in the virtual volume VVOL to the physical storage apparatus 3, to which the access path is connected, which is connected to the virtual volume VVOL via the access path (SP26). The storage management program 50 thereafter proceeds to step SP29.

Moreover, the storage management program 50 calls the back-end load balancing module 56 (FIG. 4) when the cause of performance deterioration identified in the performance deterioration cause identification processing of step SP24 is "back-end", and causes the back-end load balancing module 56 to perform the back-end load balancing processing of migrating data between the physical storage devices 23, regarding all physical storage apparatus 3 which are assigning the physical page PP (FIG. 5) to the corresponding virtual volume VVOL, so that the ratio of the amount of data stored in the respective physical storage devices 23 (FIG. 3) in that physical storage apparatus 3 becomes the same ratio as the ratio of the storage capacity of the respective physical storage devices 23 (SP27). The storage management program 50 thereafter proceeds to step SP29.

In addition, the storage management program 50 calls the front-end load balancing module 57 (FIG. 4) when the cause of performance deterioration identified in the performance deterioration cause identification processing of step SP24 is "front-end", and causes the front-end load balancing module 57 to perform the front-end load balancing processing of switching, to another physical storage apparatus 3, the physical storage apparatus 3 that is connected with that virtual volume VVOL via the access path (SP28). The storage management program 50 thereafter proceeds to step SP29.

Thereafter, the storage management program 50 determines whether the processing of step SP22 to step SP28 is complete regarding all entries for which information was acquired from the performance-deteriorated virtual volume management table 64 (FIG. 17) in step SP21 (SP29). When the storage management program 50 obtains a negative result in the foregoing determination, it returns to step SP22 and thereafter repeats the processing of step SP22 to step SP29 while sequentially switching the entry to be selected in step SP22 to another unprocessed entry.

When the storage management program 50 obtains a positive result in step SP29 as a result of eventually completing the processing of step SP22 to step SP28 regarding all entries of the performance-deteriorated virtual volume management table 64 (all virtual volumes VVOL in the virtual storage apparatus VST), it ends the storage management processing.

(2-3-3-2) Virtual Volume Performance Deterioration Determination Processing

Figure 28A:
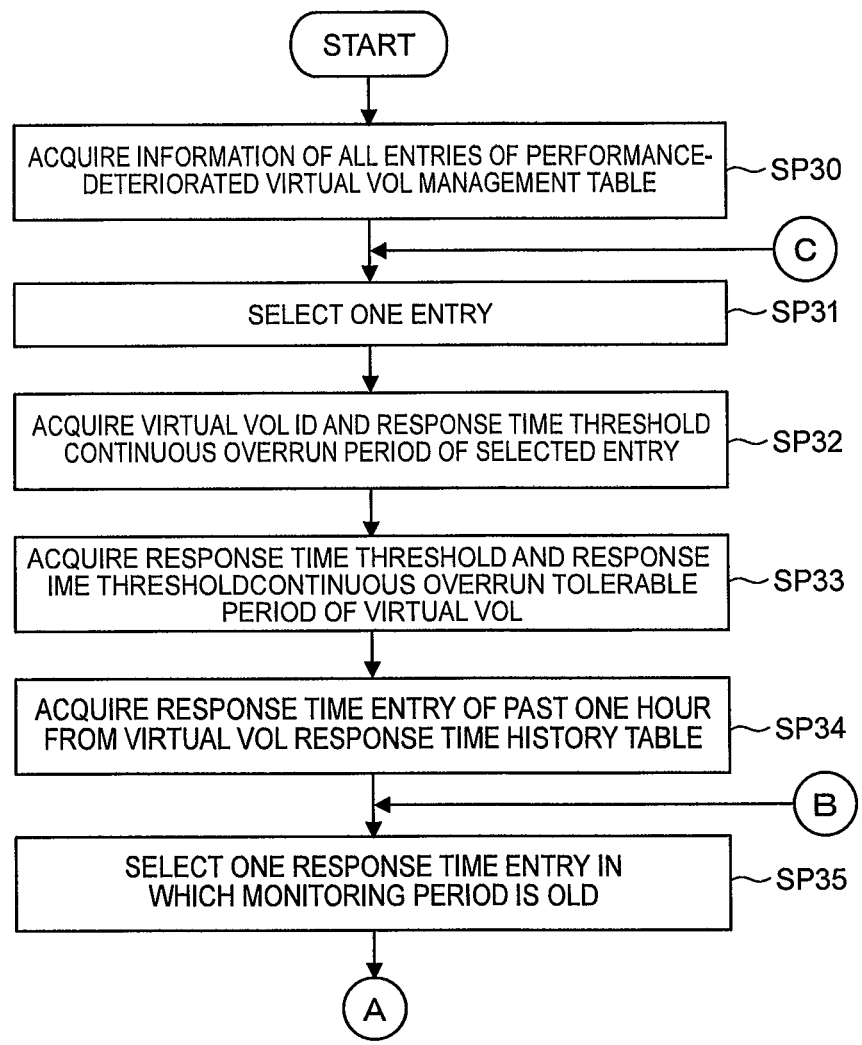
FIG. 28A is a flowchart showing the processing routine of the virtual volume performance deterioration determination processing.
Figure 28B:
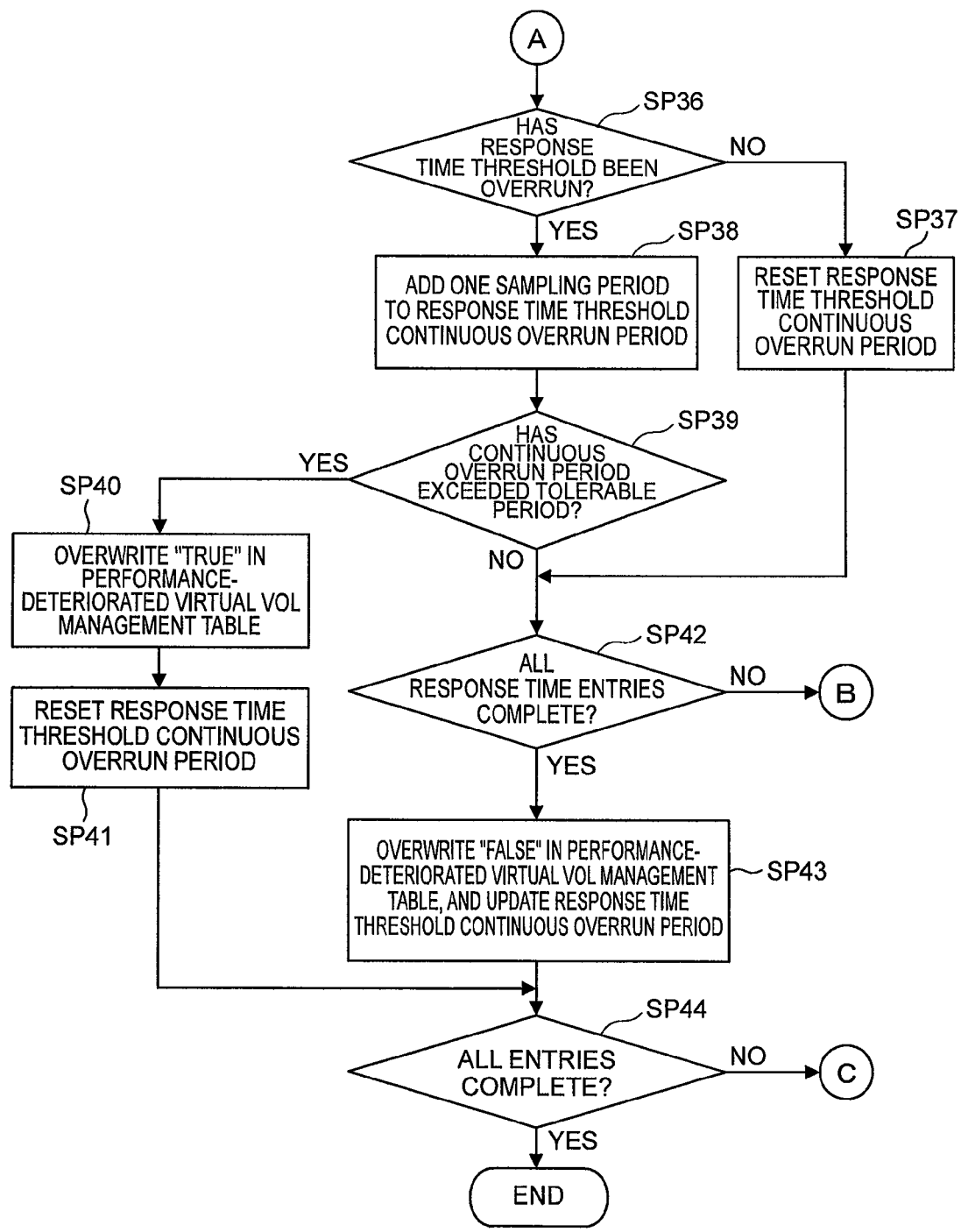
FIG. 28B is a flowchart showing the processing routine of the virtual volume performance deterioration determination processing.

FIG. 28A and FIG. 28B show the specific processing routine of the virtual volume performance deterioration determination processing performed by the virtual volume performance deterioration determination module 53 (FIG. 4) that was called in step SP20 of the foregoing storage management processing (FIG. 27).

When the virtual volume performance deterioration determination module 53 is called by the storage management program 50 in step SP20 of the storage management processing, it starts the virtual volume performance deterioration determination processing shown in FIG. 28A and FIG. 28B, and foremost reads the information of all entries from the performance-deteriorated virtual volume management table 64 (FIG. 17) (SP30), and selects one entry among all entries for which information was read (SP31).

Subsequently, the virtual volume performance deterioration determination module 53 acquires the virtual volume ID and the response time threshold continuous overrun period respectively stored in the virtual volume ID column 64A and the response time threshold continuous overrun period column 64C of the entry selected in step SP31 (SP32).

Moreover, the virtual volume performance deterioration determination module 53 acquires, from the virtual volume performance deterioration determination condition definition table 66 (FIG. 19), the response time threshold and the response time threshold continuous overrun tolerable period which are set regarding the corresponding virtual volume (this is hereinafter referred to as the "corresponding virtual volume") VVOL of the entry selected in step SP31 (SP33). Specifically, the virtual volume performance deterioration determination module 53 acquires, in step SP33, the value (response time threshold) stored in the response time threshold column 66B (FIG. 19) of the entry associated with the corresponding virtual volume VVOL and the value (response time threshold continuous overrun tolerable period) stored in the response time threshold continuous overrun tolerable period column 66C (FIG. 19) of the virtual volume performance deterioration determination condition definition table 66.

Subsequently, the virtual volume performance deterioration determination module 53 acquires, from the virtual volume response time history table 67 (FIG. 20), information respectively stored in the monitoring period column 67B (FIG. 20) and the response time column 67C corresponding thereto (these are hereinafter collectively referred to as the "response time entries") for the past 1 hour regarding the corresponding virtual volume VVOL (SP34).

Subsequently, the virtual volume performance deterioration determination module 53 selects one response time entry with the oldest monitoring period among the respective response time entries for which information was acquired in step SP34 (SP35), and determines whether the response time stored in the response time column 67C (FIG. 20) of the selected response entry has overrun the response time threshold acquired in step SP33 (SP36).

When the virtual volume performance deterioration determination module 53 obtains a negative result in the foregoing determination, it updates, to "0", the response time threshold continuous overrun period stored in the response time threshold continuous overrun period column 64C (FIG. 17) of the entry associated with the corresponding virtual volume VVOL in the performance-deteriorated virtual volume management table 64 (FIG. 17) (SP37), and thereafter proceeds to step SP40.

Meanwhile, when the virtual volume performance deterioration determination module 53 obtains a positive result in the determination of step SP36, it updates, to a value obtained by adding the time worth one monitoring period, the response time threshold continuous overrun period stored in the response time threshold continuous overrun period column 64C (FIG. 17) of the entry associated with the corresponding virtual volume VVOL in the performance-deteriorated virtual volume management table 64 (FIG. 17) (SP38).

Subsequently, the virtual volume performance deterioration determination module 53 determines whether the updated response time threshold continuous overrun period, which was updated in step SP38, exceeds the response time threshold continuous overrun tolerable period acquired in step SP33 (SP39).

When the virtual volume performance deterioration determination module 53 obtains a positive result in the foregoing determination, it updates, to "true", the value stored in the performance deterioration information column 64B (FIG. 17) of the entry associated with the corresponding virtual volume VVOL in the performance-deteriorated virtual volume management table 64 (FIG. 17) (SP40). In addition, the virtual volume performance deterioration determination module 53 updates, to "0", the response time threshold continuous overrun period stored in the response time threshold continuous overrun period column 64C (FIG. 17) of the entry corresponding to the corresponding virtual volume VVOL in the performance-deteriorated virtual volume management table 64 (SP41), and thereafter proceeds to step SP44.

Meanwhile, when the virtual volume performance deterioration determination module 53 obtains a negative result in the determination of step SP39, it determines whether the processing of step SP35 to step SP43 is complete regarding all response time entries of the past 1 hour for which information was acquired in step SP34 (SP44).

When the virtual volume performance deterioration determination module 53 obtains a negative result in the foregoing determination, it returns to step SP35, and thereafter repeats the processing of step SP35 to step SP42 while sequentially switching the response time entries selected in step SP35 one by one to a new response time entry.

When the virtual volume performance deterioration determination module 53 obtains a positive result in step SP42 as a result of eventually completing the processing of step SP35 to step SP41 regarding all response time entries of the past 1 hour for which information was acquired in step SP34, it updates, to "false", the value stored in the performance deterioration information column 64B (FIG. 17) of the entry associated with the corresponding virtual volume VVOL in the performance-deteriorated virtual volume management table 64, and additionally updates the value stored in the response time threshold continuous overrun period column 64C (FIG. 17) of that entry to the value of the results of addition obtained in step SP38 (SP43).

Thereafter, the virtual volume performance deterioration determination module 53 determines whether the processing of step SP31 to step SP43 is complete regarding all entries (all virtual volumes VVOL created in the virtual storage apparatus VST) for which information was acquired in step SP30 (SP44).

When the virtual volume performance deterioration determination module 53 obtains a negative result in the foregoing determination, it returns to step SP31, and thereafter repeats the processing of step SP31 to step SP44 while sequentially switching the entry selected in step SP31 to another unprocessed entry.

When the virtual volume performance deterioration determination module 53 obtains a positive result in step SP44 as a result of eventually completing the processing of step SP31 to step SP43 regarding all virtual volumes VVOL created in the virtual storage apparatus VST, it ends the virtual volume performance deterioration determination processing.

(2-3-3-3) Performance Deterioration Cause Identification Processing

FIG. 29 shows the specific processing routine of the performance deterioration cause identification processing that is performed by the performance deterioration cause identification module 54 in step SP24 of the foregoing storage management processing described with reference to FIG. 27.

The performance deterioration cause identification module 54 starts the performance deterioration cause identification processing shown in FIG. 29 when it is called by the storage management program 50 in step SP24 of the storage management processing. Foremost, the performance deterioration cause identification module 54 receives, from the storage management program 50, the virtual volume ID of the virtual volume (performance-deteriorated virtual volume) for which a positive result was obtained in step SP23 of the storage management processing (SP50).

Subsequently, the performance deterioration cause identification module 54 acquires, from the physical storage apparatus performance metric history table 70 (FIG. 24), the performance metric value (CPU busy rate and cache memory utilization) that was last acquired from the physical storage apparatus 3, to which the access path of the performance-deteriorated virtual volume VVOL is connected, among the physical storage apparatuses 3 configuring the virtual storage apparatus VST (SP51).

Subsequently, the performance deterioration cause identification module 54 refers to the physical storage apparatus performance metric threshold definition table 69 (FIG. 21), and determines whether at least one among the performance metric values (CPU busy rate and cache memory utilization) acquired in step SP51 is greater than the predetermined CPU busy rate threshold or cache memory utilization threshold (SP52).

When the performance deterioration cause identification module 54 obtains a positive result in the foregoing determination, it identifies that the cause of performance deterioration of the performance-deteriorated virtual volume VVOL is a result of the increase in load of the front-end of the physical storage apparatus 3 to which the access path is connected; that is, it identifies the cause as "front-end" (SP53), and thereafter proceeds to step SP58.

Meanwhile, when the performance deterioration cause identification module 54 obtains a negative result in the determination of step SP52, it refers to the inter-apparatus communication performance management table 71 (FIG. 24) and the inter-apparatus data traffic history table 72 (FIG. 25), and determines whether there is a period in which the data transfer average amount of inter-apparatus communication with the physical storage apparatus 3 to which the access path is connected as the access source and another physical storage apparatus 3 as the access destination, which was last acquired from the physical storage apparatus 3, to which the access path of the performance-deteriorated virtual volume VVOL is connected, among the physical storage apparatuses 3 configuring the virtual storage apparatus VST, exceeds the maximum data traffic theoretical value of inter-apparatus communication (SP55).

When the performance deterioration cause identification module 54 obtains a positive result in the foregoing determination, it identifies that the cause of performance deterioration of the performance-deteriorated virtual volume VVOL is a result of the increase in data transfer load between the physical storage apparatus 3 to which the access path is connected and another physical storage apparatus 3; that is, it identifies the cause as "inter-apparatus communication" (SP56), and thereafter proceeds to step SP58. Meanwhile, when the performance deterioration cause identification module 54 obtains a negative result in the determination of step SP55, it identifies that the cause of performance deterioration of the performance-deteriorated virtual volume VVOL is a result of the increase in load of the back-end of the physical storage apparatus 3; that is, it identifies the cause as "back-end" (SP57), and thereafter proceeds to step SP58.

Subsequently, the performance deterioration cause identification module 54 returns the cause of performance deterioration of the performance-deteriorated virtual volume VVOL that was identified in the foregoing processing of step SP50 to step SP57 to the storage management program 50 (SP58), and thereafter ends the performance deterioration cause identification processing.

(2-3-3-4) Inter-Apparatus Communication Load Reduction Processing and Page Migration Processing The inter-apparatus communication load reduction module 55 starts the inter-apparatus communication load reduction processing when it is called by the storage management program 50 in step SP26 of the storage management processing, and foremost acquires, from the performance-deteriorated virtual volume management table 64, the virtual volume ID of the performance-deteriorated virtual volume VVOL associated with the target entry in the performance-deteriorated virtual volume management table 64 (FIG. 17).

Subsequently, the inter-apparatus communication load reduction module 55 sends, to all physical storage apparatuses 3 configuring the virtual storage apparatus VST, an execution command of page migration processing (this is hereinafter referred to as the "page migration processing execution command") of migrating, to the physical storage apparatus 3 connected to the performance-deteriorated virtual volume VVOL via the access path, all data stored in the physical page PP (FIG. 5) assigned from the physical storage apparatus 3 to the performance-deteriorated virtual volume VVOL for which the virtual volume ID of that performance-deteriorated virtual volume VVOL was acquired from that physical storage apparatus 3.

Here, the inter-apparatus communication load reduction module 55 stores the acquired virtual volume ID in the page migration processing execution command. The inter-apparatus communication load reduction module 55 thereafter ends the inter-apparatus communication load reduction processing.

The page migration module 31 of the physical storage apparatus 3 starts the page migration processing upon receiving the page migration processing execution command, and foremost acquires, from the page migration processing execution command, the virtual volume ID of the performance-deteriorated virtual volume VVOL stored in that page migration processing execution command.

Subsequently, the page migration module 31 refers to the path management table 34 (FIG. 9), and determines whether the access path is connected to the own physical storage apparatus. Specifically, the page migration module 31 determines whether the port ID of the SAN port 24A in the own physical storage apparatus is stored in the physical storage apparatus port ID column 34C of the path management table 34.

Here, to obtain a positive result in the foregoing determination means that the own physical storage apparatus is the physical storage apparatus 3, to which the access path is connected, that is connected to the performance-deteriorated virtual volume VVOL via the access path and, therefore, there is no need to migrate the data in the own physical storage apparatus to another physical storage apparatus 3. Consequently, in the foregoing case, the page migration module 31 ends the page migration processing.

Meanwhile, if the own physical storage apparatus is not the physical storage apparatus 3, to which the access path is connected, that is connected to the performance-deteriorated virtual volume VVOL via the access path, data in the own physical storage apparatus needs to be migrated to a physical storage apparatus 3 to which the access path is connected. Consequently, in the foregoing case, the page migration module 31 reads, from the path management table 34 (FIG. 9), the physical storage apparatus ID of the physical storage apparatus 3, to which the access path is connected, that is connected to the performance-deteriorated virtual volume VVOL via the access path.

Subsequently, the page migration module 31 refers to the logical page management table 33 (FIG. 8) and identifies all physical pages PP (FIG. 5) assigned from the own physical storage apparatus to the performance-deteriorated virtual volume VVOL, accesses the physical storage apparatus 3 to which the access path is connected, and migrates the data stored in the respective physical pages PP to the physical storage apparatus 3 to which the access path is connected. The page migration module 31 thereafter ends the page migration processing.

(2-3-3-5) Backend Load Balancing Processing

The specific processing routine of the back-end load balancing processing that is executed by the back-end load balancing module 56 (FIG. 4) in step SP27 of the foregoing storage management processing (FIG. 27) is now explained.

The back-end load balancing module 56 starts the back-end load balancing processing when it is called by the storage management program 50 in step SP27 of the storage management processing (FIG. 27), and foremost selects one physical storage apparatus 3 that is assigning a storage area to the target virtual volume VVOL, and determines whether that physical storage apparatus 3 can be subject to the re-balance processing of migrating data between the physical storage devices 23 so that the ratio of consumption capacity of the respective physical storage devices 23 becomes the same as the capacity ratio of that physical storage device 23.

When the re-balance processing cannot be performed such in cases where the physical storage device 23 that is being used is subject to a failure, the back-end load balancing module 56 ends the back-end load balancing processing.

Meanwhile, when the re-balance processing can be performed, the back-end load balancing module 56 executes the page migration preprocessing of deciding data stored in which physical storage device 23 should be migrated to which physical storage device 23.

Subsequently, the back-end load balancing module 56 calculates the number of pages of the physical pages from which data is to be migrated, and thereafter executes the data migration between the corresponding physical storage devices 23 based on the results of step SP81 and step SP82. The back-end load balancing module 56 thereafter ends the back-end load balancing processing.

In the load balancing processing, the migration overhead can be reduced when there is data access involving inter-apparatus communication by migrating pages containing the data, from the physical storage apparatus 3 storing that data, to the physical storage apparatus 3 to which the access path is directly connected when the pages containing the data are transferred from the host computer 2 to the storage apparatus to which the access path is directly set.

Moreover, it is also effective in terms of system management to store the application program 15 (FIG. 2) running on the host computer 2 by associating it with the virtual volume VVOL, identifying the application program 15 in which the data access involving inter-apparatus communication is greater than the predetermined frequency, and subjecting the virtual volume VVOL associated with that application program 15 to page migration.

In particular, when promptly migrating the set of a plurality of virtual volumes VVOL used by the application program 15 to the added physical storage apparatus 3 and managing the same, it is also necessary to migrate pages of relatively low access frequency and, therefore, it is possible to monitor the operational status of the system and migrate the set of the virtual volumes VVOL used by the application program 15 within a predetermined bandwidth of inter-apparatus communication without affecting regular activities.

Figure 30:
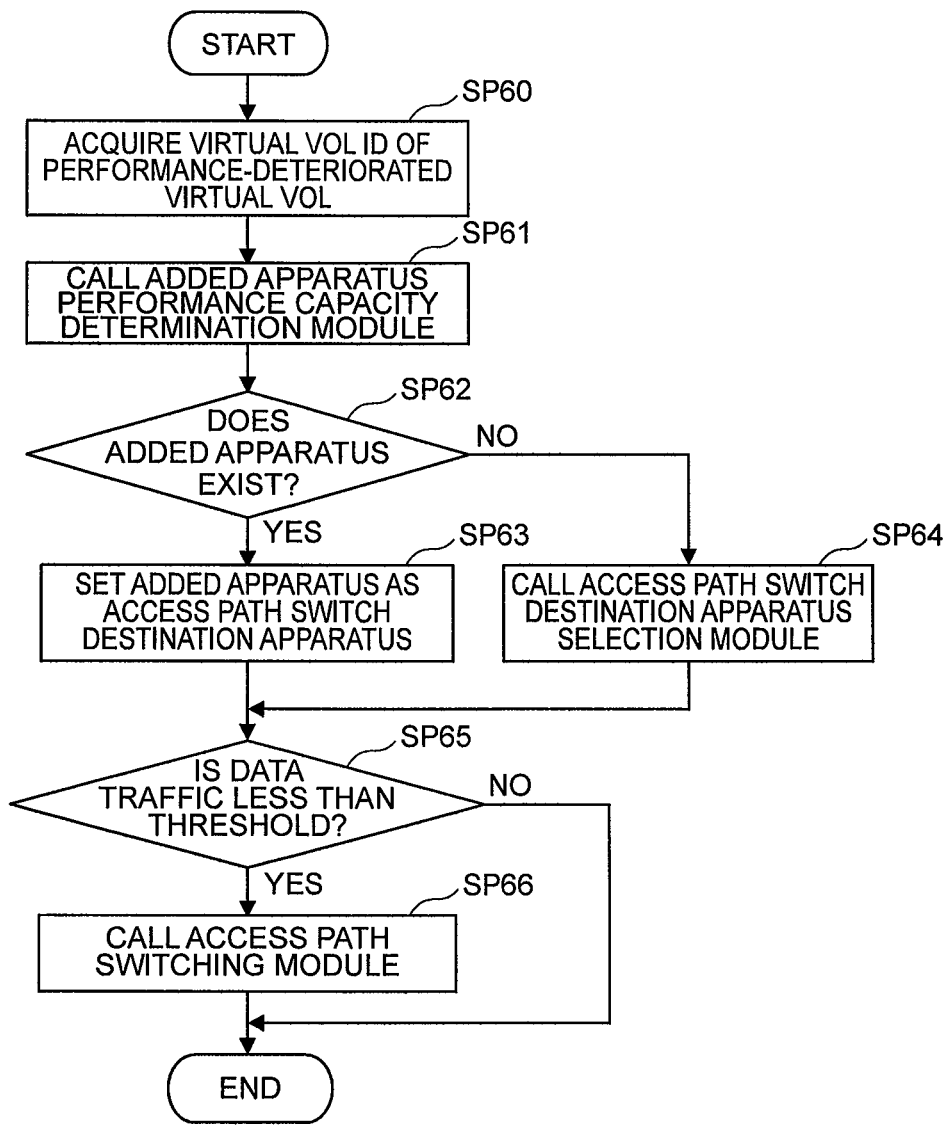
FIG. 30 is a flowchart showing the processing routine of the front-end load balancing processing.

(2-3-3-6) Frontend Load Balancing Processing (2-3-3-6-1) Frontend Load Balancing Processing FIG. 30 shows the specific processing routine of the frontend load balancing processing that is executed by the frontend load balancing module 57 (FIG. 4 in step SP28 of the foregoing storage management processing (FIG. 27).

The front-end load balancing module 57 starts the front-end load balancing processing shown in FIG. 30 when it is called by the storage management program 50 in step SP27 of the storage management processing, and foremost acquires, from the storage management program 50, the virtual volume ID of the virtual volume (performance-deteriorated virtual volume) VVOL in which the performance was determined as having deteriorated in step SP23 of the storage management processing (SP60).

Subsequently, the front-end load balancing module 57 calls the added apparatus performance capacity determination module 58 (FIG. 4), and causes the added apparatus performance capacity determination module 58 to perform the added apparatus performance capacity determination processing of determining whether there is a physical storage apparatus 3 that was added and possesses sufficient performance capacity (SP61).

Subsequently, the front-end load balancing module 57 determines whether it has been determined that there is a physical storage apparatus 3 that was added and possesses sufficient performance capacity based on the processing results of the added apparatus performance capacity determination processing sent from the added apparatus performance capacity determination module 58 in step SP60 (SP62).

When the front-end load balancing module 57 obtains a positive result in the foregoing determination, it sets the physical storage apparatus 3 that was determined as having been added and possessing sufficient performance capacity as the physical storage apparatus 3 of the access path switch destination for the performance-deteriorated virtual volume VVOL for which the virtual volume ID was acquired in step SP60 (SP63).

Meanwhile, when the front-end load balancing module 57 obtains a negative result in the determination of step SP62, it calls the access path switch destination apparatus selection module 59 (FIG. 4), and causes the access path switch destination apparatus selection module 59 (FIG. 4) to execute the access path switch destination apparatus selection processing of selecting the physical storage apparatus 3 to become the access path switch destination for the performance-deteriorated virtual volume VVOL for which the virtual volume ID was acquired in step SP60 (SP64).

Consequently, the access path switch destination apparatus selection module 59 called by the front-end load balancing module 57 selects the physical storage apparatus 3 to become the access path switch destination by performing the access path switch destination apparatus selection processing described later, and returns the physical storage apparatus ID thereof to the front-end load balancing module 57.

Subsequently, the front-end load balancing module 57 refers to the inter-apparatus communication performance management table 71 (FIG. 24) and the inter-apparatus data traffic history table 72 (FIG. 25), and determines whether the data traffic between the physical storage apparatus 3 as the access path switch destination that was set in step SP63 or the physical storage apparatus 3 given the physical storage apparatus ID that was returned from the access path switch destination apparatus selection module 59 in step SP64, and each of the other physical storage apparatuses 3 falls below the theoretical value of the maximum data traffic between the physical storage apparatus 3 as the access path switch destination that was set in step SP63 or the physical storage apparatus 3 given the physical storage apparatus ID that was returned from the access path switch destination apparatus selection module 59 in step SP64, and the other physical storage apparatuses 3 (SP65).

When the front-end load balancing module 57 obtains a positive result in the foregoing determination, it calls an access path switching module not shown, and causes the access path switching module to perform the access path switching processing of switching the access path between the performance-deteriorated virtual volume VVOL for which the virtual volume ID was acquired in step SP60 and the virtual storage apparatus VST to the physical storage apparatus 3 as the access path switch destination that was set in step SP63 or the physical storage apparatus 3 given the physical storage apparatus ID that was returned in step SP64 (SP66). The front-end load balancing module 57 thereafter ends the front-end load balancing processing.

Consequently, the access path switching module called by the front-end load balancing module 57 gives a command to the host computer 2 to switch the access path to the designated performance-deteriorated virtual volume VVOL to the designated physical storage apparatus 3.

Moreover, the access path switching module updates the path management table 68 (FIG. 21) so as to switch the access path to the designated performance-deteriorated virtual volume VVOL to the designated physical storage apparatus 3. Specifically, the access path switching module updates, to "true", the information stored in the access path setting information column 68F (FIG. 21) of the entry associated with the designated physical storage apparatus 3 among the entries associated with the performance-deteriorated virtual volume VVOL in the path management table 68. Moreover, the host computer 2 simultaneously updates, to "false", the information stored in the access path setting information column 68F of the entry associated with the physical storage apparatus 3 to which the access path was connected up to that time.

In addition, the CPU 10 of the host computer 2 that received the foregoing command updates the corresponding path management table 17 (FIG. 6) stored in the memory 11 (FIG. 2) so as to switch the access path to the performance-deteriorated virtual volume VVOL to the designated physical storage apparatus 3. Specifically, the CPU 10 updates, to "true", the information stored in the access path setting information column 17E (FIG. 6) of the entry associated with the performance-deteriorated virtual volume VVOL in the path management table 17 corresponding to the performance-deteriorated virtual volume VVOL. Moreover, the host computer 2 updates, to "false", the information stored in the access path setting information column 17E of the entry associated with the physical storage apparatus 3 to which the access path was connected up to that time. Consequently, the host computer 2 will thereafter access the performance-deteriorated virtual volume VVOL via the physical storage apparatus 3 associated with the entry in which "true" is stored in the access path setting information column 17E (that is, the physical storage apparatus 3 as the access path switch destination that was set in step SP63 or the physical storage apparatus 3 given the physical storage apparatus ID that was returned in step SP64).

Meanwhile, when a negative result is obtained in step SP65 and the access path to the target performance-deteriorated virtual volume VVOL is switched to the physical storage apparatus 3 as the access path switch destination that was set in step SP63 or the physical storage apparatus 3 given the physical storage apparatus ID that was returned in step SP64, there is a possibility that the performance of the virtual volume will deteriorate when viewed from the host computer 2 due to the data transfer between that physical storage apparatus 3 and another physical storage apparatus 3 becoming the bottleneck. Thus, in the foregoing case, the front-end load balancing module 57 ends the front-end load balancing processing without calling the access path switching module.

(2-3-3-6-2) Added Apparatus Performance Capacity Determination Processing

Processing of the added apparatus performance capacity determination module 58 is now explained.

Foremost, the added apparatus performance capacity determination module 58 refers to the virtual storage apparatus configuration management table 62 (FIG. 15), and acquires the ID of all physical storage apparatuses 3 configuring the virtual storage apparatus VST.

Subsequently, the added apparatus performance capacity determination module 58 acquires, from the physical storage apparatus performance metric history table 70, the CPU busy rate and the cache memory utilization regarding all of the acquired physical storage apparatus IDs. The metric value that is acquired here may only be the latest value, or an average value of the values during a given period in the past.

Subsequently, the added apparatus performance capacity determination module 58 determines whether the acquired metric value exceeds the setting value stored in the added apparatus setting value management table 63 (FIG. 16). When a positive result is obtained in the foregoing determination, the physical storage apparatus 3 rewrites the contents of the added apparatus setting value management table 63 so that it is not treated as an added physical storage apparatus in the subsequent processing.

(2-3-3-6-3) Access Path Switch Destination Apparatus Selection Processing

The access path switch destination apparatus selection processing that is performed by the access path switch destination apparatus selection module 59 called in step SP64 of the front-end load balancing processing (FIG. 30) is now explained. The module 59 selects the physical storage apparatus to become the optimal access path switch destination among the physical storage apparatuses other than the physical storage apparatus to which the access path is connected.

Foremost, the access path switch destination apparatus selection module 59 refers to the virtual storage apparatus configuration management table 62 as a list of physical storage apparatuses 3 that may become the access path switch destination, and acquires a list of physical storage apparatuses 3 to which an alternative path of the access path is connected.

Subsequently, the access path switch destination apparatus selection module 59 refers to the physical storage apparatus performance metric threshold definition table 69 and the physical storage apparatus performance metric history table 70 regarding each of the acquired physical storage apparatuses 3 and creates a list of physical storage apparatuses 3 in which all performance metric values fall below the performance metric threshold.

Subsequently, the access path switch destination apparatus selection module 59 performs processing of deciding, from the physical storage apparatus list, a physical storage apparatus 3 that is currently connected to the physical storage apparatus 3, to which the access path is connected, via a path with the optimal inter-apparatus data transfer throughput. The physical storage apparatus 3 decided in this processing is set as the physical storage apparatus 3 of the access path switch destination.

In this embodiment, the inter-apparatus data transfer time t is adopted as the index of the inter-apparatus data transfer throughput. The inter-apparatus data transfer time t is calculated with the following formula with the number of logical pages of the virtual volume VVOL to be migrated from the physical storage apparatus 3 to which the access path is connected to the physical storage apparatus 3 to become the access path switch destination as p, the data amount per logical page as v, the data transferable amount per unit time as a, and the number of paths that can be used for the data transfer as n.

[Math 2]

$$t = \frac{p \times v}{a} \times \frac{1}{n} \qquad (2)$$

The number of logical pages p to be migrated shall be the total number of physical pages PP existing in the physical storage apparatus 3 to which the access path of the virtual volume VVOL is connected at such time among the logical pages LP configuring that performance-deteriorated virtual volume VVOL. This is because, after the switching of the access path, based on the hierarchal data management function of the management computer 4, data of the logical pages LP having a high access frequency is migrated from the physical storage apparatus 3 to which the access path was connected before the switching of the access path to the physical storage apparatus 3 to become the access path switch destination.

Meanwhile, the data transferable amount a is the value obtained by subtracting the actual measured value from the logical maximum value regarding the inter-apparatus data traffic. The logical maximum value of the inter-apparatus data traffic can be acquired by referring to the inter-apparatus communication performance management table 71 and the actual measured value of the inter-apparatus data traffic can be acquired by referring to the inter-apparatus data traffic history table 72.

(2-4) Access Path Manual Switching Function
(2-4-1) Outline of Access Path Manual Switching Function The management computer 4 of this embodiment is loaded with an access path manual switching function which allows the system administrator to manually switch the access path to one's intended path in addition to the foregoing access path automatic switching function of automatically switching the access path, which is from the performance-deteriorated virtual volume VVOL to the virtual storage apparatus VST, from the physical storage apparatus 3 to which the current access path is connected to another physical storage apparatus 3.

In addition, when the operation mode (access path manual switching mode) based on the access path manual switching function is selected and set rather than the operation mode (access path automatic switching mode) based on the foregoing access path automatic switching function as the operation mode, the storage management program 50 (FIG. 4) causes the virtual volume performance deterioration determination module 53 to execute the foregoing virtual volume performance deterioration determination processing explained with reference to FIG. 28A and FIG. 28B, and thereafter calls the access path switch destination port display module 60.

Figure 31:
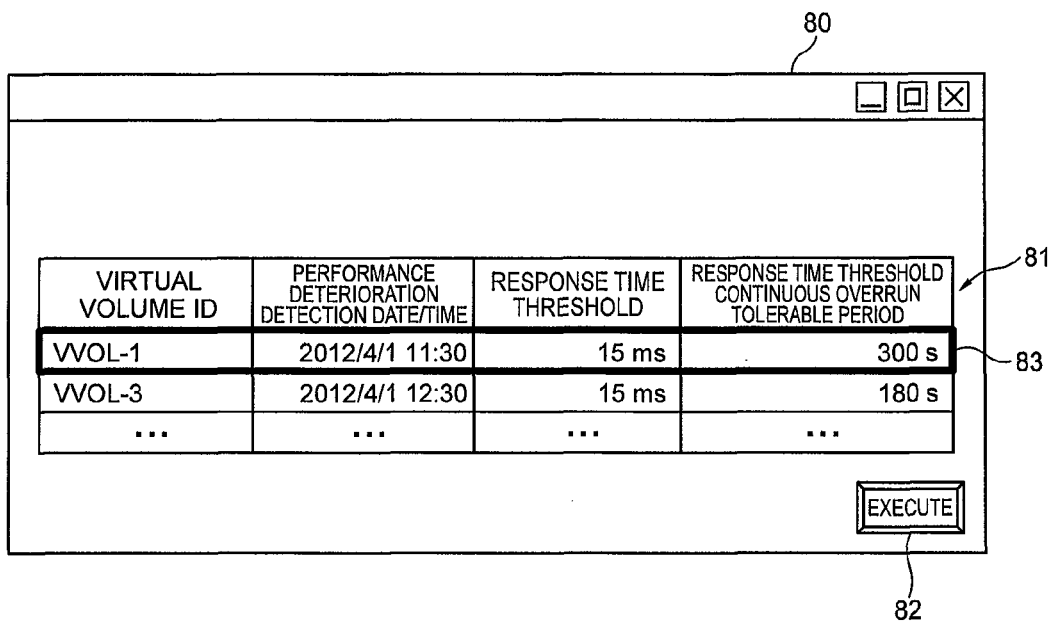
FIG. 31 is a schematic line diagram showing the schematic configuration of the performance-deteriorated virtual volume information display screen.

When the access path switch destination port display module 60 is called by the storage management program 50, it displays the performance-deteriorated virtual volume information display screen 80 shown in FIG. 31 on a monitor (not shown) of the management computer 4 based on the processing results of the virtual volume performance deterioration determination processing (FIG. 28A and FIG. 28B) performed by the virtual volume performance deterioration determination module 53.

The performance-deteriorated virtual volume information display screen 80 is configured, as evident from FIG. 31, a performance-deteriorated virtual volume list 81, and an execution button 82. In addition, displayed in the performance-deteriorated virtual volume list 81 are the virtual volume ID of the virtual volume (performance-deteriorated virtual volume) VVOL in which the performance was determined as having deteriorated in the virtual volume performance deterioration determination processing, the date/time in which the performance deterioration of the performance-deteriorated virtual volume VVOL was detected, and the response time threshold and the response time threshold continuous overrun tolerable period that were set regarding that performance-deteriorated virtual volume VVOL.

Subsequently, with the performance-deteriorated virtual volume information display screen 80, the system administrator can designate, using a cursor 83, the intended performance-deteriorated virtual volume VVOL among the performance-deteriorated virtual volumes VVOL for which information such as the virtual volume ID is displayed in the performance-deteriorated virtual volume list 81. As a result of the system administrator designating the intended performance-deteriorated virtual volume VVOL by operating the cursor and thereafter clicking the execution button 82, the access path switch destination display screen 90 shown in FIG. 32 can be displayed on the monitor of the management computer 4.

The access path switch destination display screen 90 presents to the system administrator the path connected to the added physical storage apparatus 3 as the new access path regarding the performance-deteriorated virtual volume (this is hereinafter referred to as the "designated performance-deteriorated virtual volume") VVOL that was designated by the cursor 83 in the performance-deteriorated virtual volume list 81 of the performance-deteriorated virtual volume information display screen 80.

Figure 32:
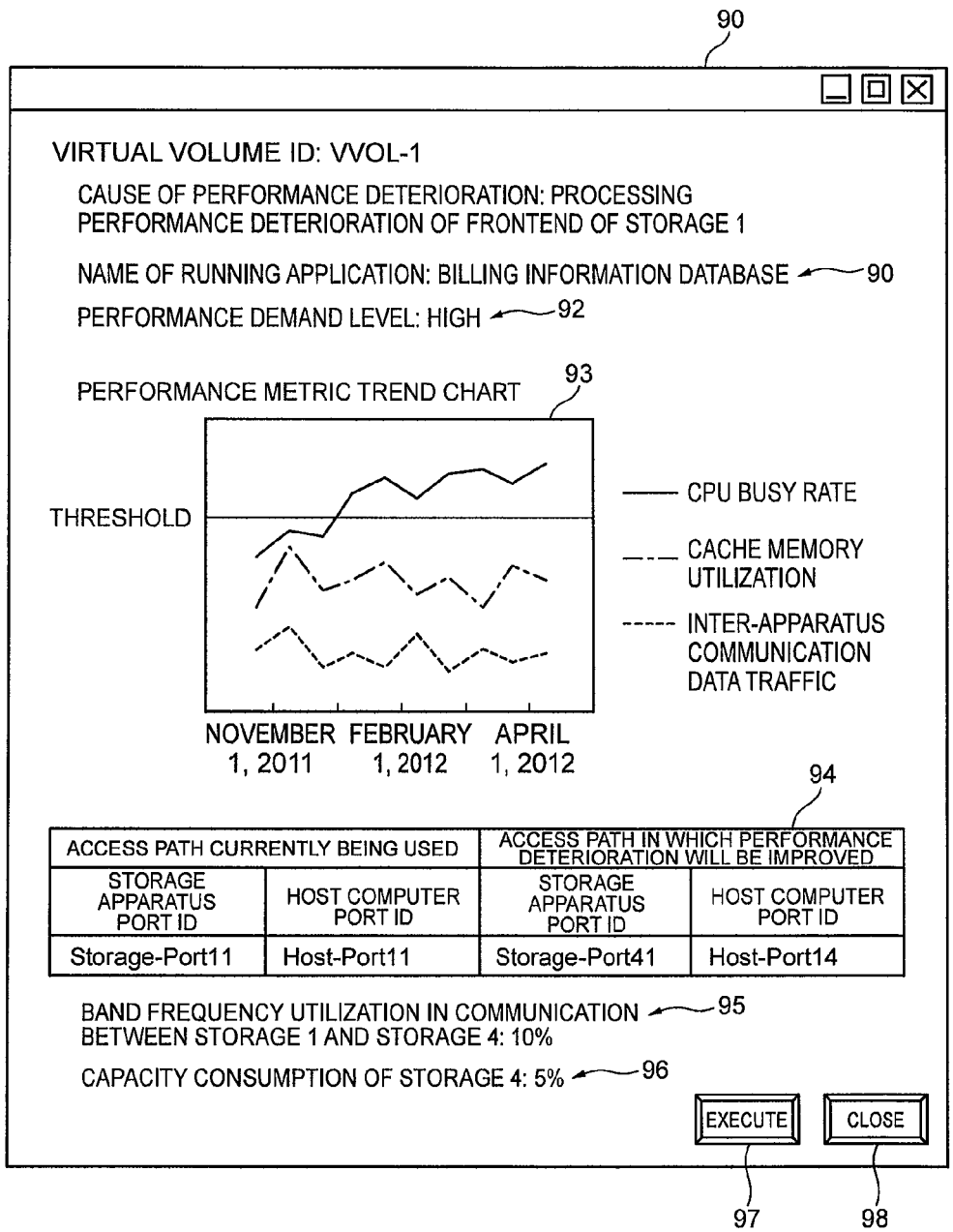
FIG. 32 is a schematic line diagram showing the schematic configuration of the access path switch destination display screen.

The access path switch destination display screen 90 is configured, as shown in FIG. 32, information associated with the application program 15 (FIG. 2) using the designated performance-deteriorated virtual volume VVOL such as the running application name 91, a performance request level 92, a performance metric trend chart 93, a performance improvement information column 94, an inter-apparatus communication band frequency utilization 95, an added storage apparatus capacity consumption rate 96, an execution button 97 and a close button 98.

Here, the access path switch destination display screen 90 may additionally display, as the operation schedule of the physical storage apparatus group in operation, for example, the maintenance period or busy period, so as to enable the confirmation of trend of the respective performance metrics during these periods.

In addition, so as to enable the system administrator to know the influence on the other application programs 15 associated with the switching of the access path, the capacity consumption and the like of the virtual volumes VVOL used by all application programs 15 may also be displayed.

The performance improvement information column 94 displays information related to the currently used access path destination regarding the designated performance-deteriorated virtual volume VVOL, and information related to the path in which the improvement in performance of the designated performance-deteriorated virtual volume VVOL can be expected by switching the access path among the paths connecting the designated performance-deteriorated virtual volume VVOL and the virtual storage apparatus VST.

Specifically, the performance improvement information column 94 displays the port ID of the SAN port 12 (FIG. 2) on the side of the host computer 2 and the port ID of the SAN port 24A (FIG. 3) on the side of the physical storage apparatus 3 to which the currently used access path is connected which connects the designated performance-deteriorated virtual volume VVOL and the virtual storage apparatus VST, and the port ID of the SAN port 12 on the side of the host computer 2 and the port ID of the SAN port 24A on the side of the physical storage apparatus 3 to which is connected the path in which the improvement in performance of the designated performance-deteriorated virtual volume VVOL is expected as a result of being used as the access path.

With the access path switch destination display screen 90, as a result of thereafter clicking the execution button 92, the access path connecting the designated performance-deteriorated virtual volume VVOL and the virtual storage apparatus VST can be switched to the path displayed on the performance improvement information column 94.

Moreover, with the access path switch destination display screen 90, by clicking the close button 98, the access path switch destination display screen 90 can be closed without switching access path connecting the designated performance-deteriorated virtual volume VVOL and the virtual storage apparatus VST to the path displayed on the performance improvement information column 94.

(2-4-2) Access Path Manual Switching Mode Processing

When the foregoing access path manual switching mode has been selected and set as the operation mode, the storage management program 50 periodically (for instance, every hour) calls the virtual volume performance deterioration determination module 53 (FIG. 4). When the virtual volume performance deterioration determination module 53 is called by the storage management program 50, it performs the foregoing virtual volume performance deterioration determination processing explained with reference to FIG. 28A and FIG. 28B of determining whether the performance of the respective virtual volumes VVOL created in the virtual storage apparatus VST is deteriorating (SP150).

Subsequently, the storage management program 50 calls the access path switch destination port display module 60 (FIG. 4). Consequently, when the access path switch destination port display module 60 is called by the storage management program 50, if executes, in accordance with the system administrator's operation, the access path switch destination port display processing of sequentially displaying, on the monitor of the management computer 4, the performance-deteriorated virtual volume information display screen 80 and the access path switch destination display screen 90 explained above with reference to FIG. 31 and FIG. 32.

Figure 33:
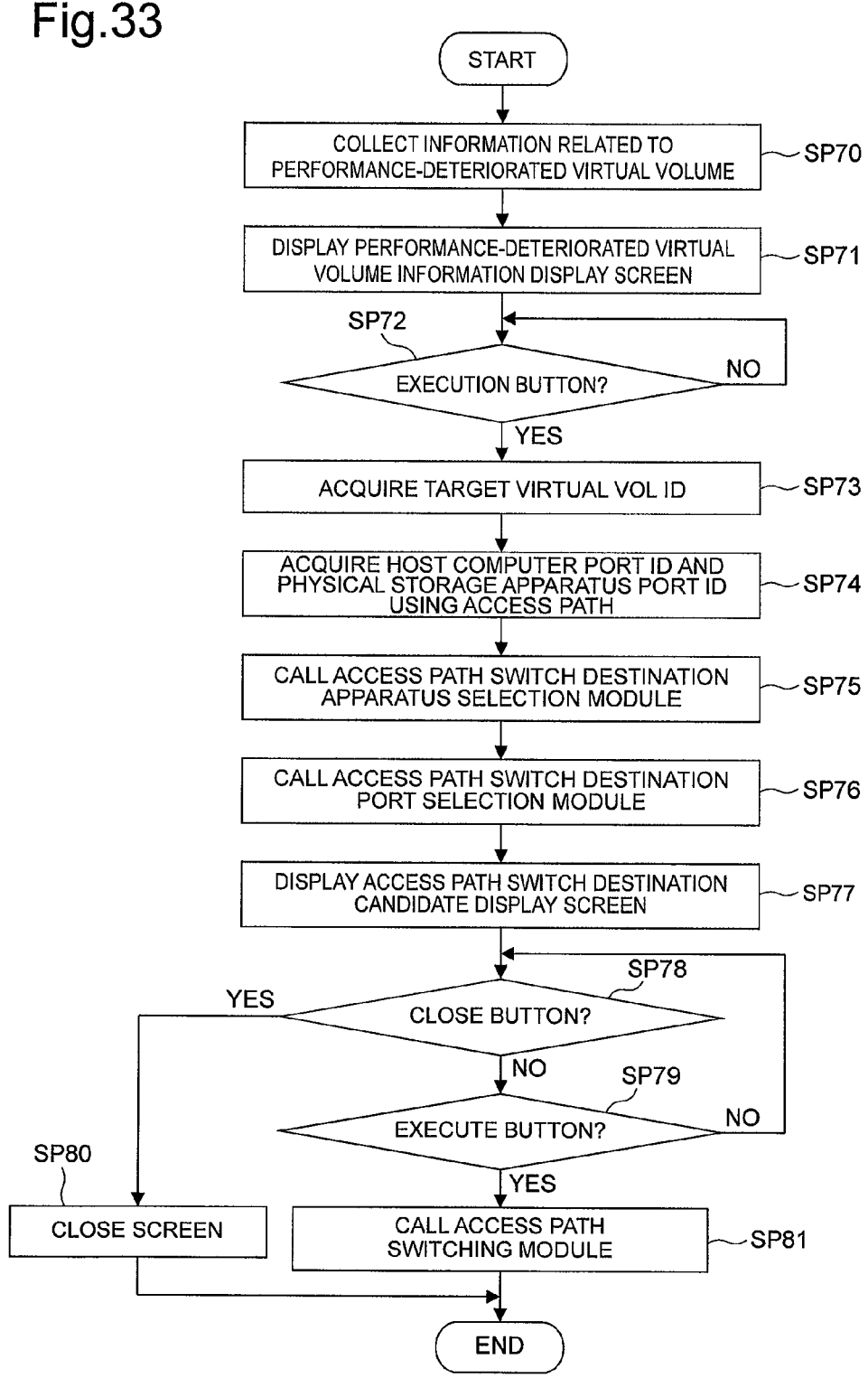
FIG. 33 is a flowchart showing the processing routine of the access path switch destination port display processing.

FIG. 33 shows the specific processing contents of the access path switch destination port display processing executed by the access path switch destination port display module 60 that was called by the storage management program 50 in step SP151 of the foregoing storage management processing.

When the access path switch destination port display module 60 is called by the storage management program 50, it starts the access path switch destination port display processing shown in FIG. 33, and foremost refers to the performance-deteriorated virtual volume management table 64 (FIG. 17), the performance-deteriorated virtual volume detection date/time management table 65 (FIG. 18) and the virtual volume performance deterioration determination condition definition table 66 (FIG. 19), and subsequently collects necessary information in relation to the performance-deteriorated virtual volume VVOL (SP70), and displays, on the monitor of the management computer 4, the foregoing performance-deteriorated virtual volume information display screen 80 explained with reference to FIG. 31 based on the collected information (SP71).

Subsequently, the access path switch destination port display module 60 waits for the execution button 82 of the performance-deteriorated virtual volume information display screen 80 to be clicked (SP72), and, when the execution button 82 is eventually clicked, acquires the virtual volume ID of the designated performance-deteriorated virtual volume VVOL that was selected from the performance-deteriorated virtual volume list 81 of the performance-deteriorated virtual volume information display screen 80 (SP73).

Subsequently, the access path switch destination port display module 60 acquires, from the path management table 68 (FIG. 21), the port ID of the SAN port 24A on the side of the physical storage apparatus and the port ID of the SAN port 12 on the side of the host computer 2 to which the access path connecting the designated performance-deteriorated virtual volume VVOL and the virtual storage apparatus VST is connected (SP74).

Thereafter, the access path switch destination port display module 60 gives, to the access path switch destination apparatus selection module 59 (FIG. 4), the foregoing access path switch destination apparatus selection processing execution command which stores the virtual volume ID acquired in step SP73 (SP75).

Consequently, the access path switch destination apparatus selection module 59 that received the foregoing access path switch destination apparatus selection processing execution command selects the physical storage apparatus 3 to become the access path switch destination by performing the foregoing access path switch destination apparatus selection processing, and returns the physical storage apparatus ID of the selected physical storage apparatus 3 to become the access path switch destination to the access path switch destination port display module 60.

Subsequently, the access path switch destination port display module 60 gives, to the access path switch destination port selection module not shown, the access path switch destination port selection processing execution command storing the physical storage apparatus ID of the physical storage apparatus 3 to become the access path switch destination acquired in step SP75 (SP76).

Consequently, the access path switch destination port selection module that acquired the access path switch destination port selection processing execution command selects the SAN port 24A having the smallest data traffic among the SAN ports 24A (FIG. 3) of the physical storage apparatus 3 with the physical storage apparatus ID stored in the access path switch destination port selection processing execution command, and returns the port ID of the selected SAN port 24A to the access path switch destination port display module 60.

In addition, the access path switch destination port display module 60 displays the foregoing access path switch destination display screen 90 explained with reference to FIG. 32 on the monitor of the management computer 4, in substitute for the foregoing performance-deteriorated virtual volume information display screen 80, based on the port ID of the SAN port 24A on the side of the physical storage apparatus 3 and the port ID of the SAN port 12 on the side of the host computer 2 to which the access path is currently connected acquired in step SP76, the physical storage apparatus ID of the physical storage apparatus 3 to become the access path switch destination acquired in step SP75, and the port ID acquired in step SP76 (SP77).

Thereafter, the access path switch destination port display module 60 waits for the close button 98 to the execution button 97 of the access path switch destination display screen 90 to be clicked (SP78, SP79).

When the close button 98 of the access path switch destination display screen 90 is clicked (SP78: YES), the access path switch destination port display module 60 closes the access path switch destination display screen 90 (SP80), and thereafter ends the access path switch destination port display processing.

Meanwhile, when the execution button 97 of the access path switch destination display screen 90 is clicked (SP79: YES), the access path switch destination port display module 60 gives the access path switching processing execution command to the access path switching module not shown (SP81), and thereafter ends the access path switch destination port display processing.

Consequently, the access path switching module that received the foregoing access path switching processing execution command performs the access path switching processing of switching, to the access path, the path connecting the SAN port 12 having the port ID on the side of the host computer 2 displayed as the access path switch destination in the access path switch destination display screen 90, and the SAN port 24A having the port ID on the side of the physical storage apparatus 3.

Consequently, the access path connecting the performance-deteriorated virtual volume VVOL and the virtual storage apparatus VST designated in the performance-deteriorated virtual volume information display screen 80 is switched to the path for connecting the SAN port 12 having the port ID on the side of the host computer 2 displayed as the access path switch destination in the access path switch destination display screen 90, and the SAN port 24A having the port ID on the side of the physical storage apparatus 3.

(3) Effect of this Embodiment

With the computer system 1 described above, when a physical storage apparatus 3 is added, since the access path to and from the host computer 2 is switched to that added physical storage apparatus 3, the I/O load of the plurality of existing physical storage apparatuses can be distributed to the added physical storage apparatus 3 in a short period of time. Consequently, it is possible to promptly shift the plurality of physical storage apparatuses configuring the cross-apparatus pool PL to a steady state, and thereby improve the stability and performance of the overall computer system 1.

(4) Other Embodiments

In the foregoing embodiments, while a case was explained where the storage management processing described above with reference to FIG. 27 is periodically performed, the present invention is not limited thereto, and the storage management processing may also be performed at odd intervals.

Moreover, in the foregoing embodiments, while a case was explained where the control unit for controlling the host computer 2 to switch, when a physical storage apparatus 3 is added to the plurality of physical storage apparatuses 3, the access path to the added physical storage apparatus 3, the performance determination unit for determining whether the performance of the virtual volume VVOL is deteriorating, and the cause identification unit for identifying the cause of performance deterioration of any virtual volume VVOL in which the performance determination unit determined that the performance is deteriorating are all configured from the CPU 40 (FIG. 4) and the storage management program 50 (FIG. 4) of the management computer 4, the present invention is not limited thereto, and the control unit, the performance determination unit and the cause identification unit may also be of a hardware configuration, and various other configurations may be broadly applied as the configuration of the control unit, the performance determination unit and the cause identification unit.

INDUSTRIAL APPLICABILITY

The present invention can be broadly applied to a computer system which manages a storage area provided by each of a plurality of storage apparatuses as a logical pool across the plurality of storage apparatuses, provides to a host computer a virtual volume associated with the logical pool, and dynamically assigns a storage area from the logical pool to the virtual volume.

REFERENCE SIGNS LIST

1 . . . computer system, 2 . . . host computer, 3 . . . physical storage apparatus, 4 . . . management computer, 5 . . . host communication network, 6 . . . inter-apparatus communication network, 12, 24A, 24B . . . SAN port, 20, 40 . . . CPU, 21, 41 . . . memory, 22 . . . cache memory, 23 . . . physical storage device, 31 . . . page migration module, 50 . . . storage management program, 51 . . . physical storage apparatus additional processing module, 52 . . . response time module measurement acquisition module, 53 . . . virtual volume performance deterioration determination module, 54 . . . performance deterioration cause identification module, 55 . . . inter-apparatus communication load reduction module, 56 . . . back-end load balancing module, 57 . . . front-end load balancing module, 58 . . . added apparatus performance capacity determination module, 59 . . . access path switch destination apparatus selection module, 60 . . . access path switch destination port display module, 62 . . . virtual storage apparatus configuration management table, 63 . . . added apparatus setting value management table, 64 . . . performance-deteriorated virtual volume management table, 65 . . . performance-deteriorated virtual volume detection date/time management table, 66 . . . virtual volume performance deterioration determination condition definition table, 67 . . . virtual volume response time history table, 68 . . . path management table, 69 . . . physical storage apparatus performance metric threshold definition table, 70 . . . physical storage apparatus performance metric history table, 71 . . . inter-apparatus communication performance management table, 72 . . . inter-apparatus data traffic history table, 80 . . . performance-deteriorated virtual volume information display screen, 90 . . . access path switch destination display screen, VOL . . . logical volume, VST . . . virtual storage apparatus, VVOL . . . virtual volume.

The invention claimed is:

1. A management apparatus in a computer system which includes a plurality of storage areas provided by each of a plurality of mutually coupled storage apparatuses as a logical pool across the plurality of storage apparatuses, provides to a host computer a virtual volume associated with the logical pool, and assigns one or more storage areas from the logical pool to the virtual volume when the host computer writes data into the virtual volume, where the host computer is coupled to the plurality of storage apparatuses via a plurality of access paths, the management apparatus comprising:
a processor; and
a memory storing instructions that, when executed by the processor, instruct the processor to:
select one of the access paths from among the plurality of access paths which the host computer uses to access the virtual volume;
control the one of the storage apparatuses coupled to the selected access path to transfer, when an I/O request from the host computer received via the selected access path is for data not respectively stored therein, the I/O request to one of the storage apparatuses storing the data of the I/O request; and
when another storage apparatus is added to the plurality of storage apparatuses, switch the selected access path to an access path to the added storage apparatus so that the host computer accesses the virtual volume via the access path to the added storage apparatus.

2. The management apparatus according to claim 1, wherein:
the memory further storing instructions that, when executed by the processor, instruct the processor to:
determine whether performance of the virtual volume is deteriorating; and
identify a cause of the performance deterioration of the virtual volume, and
wherein the processor controls the host computer to switch a destination of the selected access path to the added storage apparatus when the cause of the performance deterioration of the virtual volume is identified to be insufficient band frequency of the selected access path so that the host computer accesses the virtual volume via the access path to the added storage apparatus.

3. The management apparatus according to claim 2, wherein, when the cause of the performance deterioration of the virtual volume is identified to be an increase in a data transfer load between the storage apparatuses, the processor controls a corresponding one of the storage apparatuses to migrate data stored in the virtual volume associated with an application to the added storage apparatus to which the access path is switched.

4. The management apparatus according to claim 3, wherein, among the data stored in the virtual volume associated with the application, the data of a page associated with the virtual volume that was accessed after the switching of the access path to the added storage apparatus is migrated to the added storage apparatus.

5. The management apparatus according to claim 3, wherein, among the data stored in the virtual volume associated with the application, the data of a page associated with the virtual volume having an access frequency which is higher than a predetermined frequency is migrated to the added storage apparatus within a predetermined range of communication load between the storage apparatuses.

6. The management apparatus according to claim 3, wherein whether the performance of the virtual volume is deteriorating is determined based on a measured value of a performance metric of the virtual volume acquired from each of the storage apparatuses.

7. The management apparatus according to claim 3, wherein the cause of the performance deterioration of the virtual volume is identified based on a measured value of a performance metric of the storage apparatuses acquired from the storage apparatus coupled to the host computer via the selected access path.

8. A management method in a computer system which includes a plurality of storage areas provided by each of a plurality of mutually coupled storage apparatuses as a logical pool across the plurality of storage apparatuses, provides to a host computer a virtual volume associated with the logical pool, and assigns one or more storage areas from the logical pool to the virtual volume when the host computer writes data into the virtual volume, where the host computer is coupled to the plurality of storage apparatuses via a plurality of access paths,
the management method comprising:
selecting one of the access paths from among the plurality of access paths which the host computer uses to access the virtual volume;
controlling the one of the storage apparatuses coupled to the selected access path to transfer, when an I/O request from the host computer received via the selected access path is for data not respectively stored therein, the I/O request to one of the storage apparatuses storing the data of the I/O request; and
switching, when another storage apparatus is added to the plurality of storage apparatuses, the selected access path to an access path to the added storage apparatus so that the host computer accesses the virtual volume via the access path to the added storage apparatus.

9. The management method according to claim 8, further comprising:
determining whether performance of the virtual volume is deteriorating;
identifying a cause of the performance deterioration of the virtual volume; and
wherein the host computer is controlled to switch a destination of the access path to the added storage apparatus when the cause of performance deterioration of the virtual volume is identified to be a result of insufficient band frequency of the selected access path.

10. The management method according to claim 9, further comprising:
when the cause of the performance deterioration of the virtual volume is identified to be a result of an increase in a data transfer load between the storage apparatuses, migrating data stored in the virtual volume associated with an application from a corresponding one of the storage apparatuses to the added storage apparatus to which the access path is switched.

11. The management method according to claim 10, wherein, among the data stored in the virtual volume associated with the application, the data of a page associated with the virtual volume that was accessed after the switching of the access path to the added storage apparatus is migrated to the added storage apparatus.

12. The management method according to claim 10, wherein, among the data stored in the virtual volume associated with the application, the data of a page associated with the virtual volume having an access frequency which is higher than a predetermined frequency is migrated to the added storage apparatus within a predetermined range of communication load between the storage apparatuses.

13. The management method according to claim 10, wherein whether the performance of the virtual volume is deteriorating is determined based on a measured value of a performance metric of the virtual volume acquired from each of the storage apparatuses.

14. The management method according to claim 10, wherein the cause of the performance deterioration of the virtual volume is identified based on a measured value of a performance metric of the storage apparatuses acquired from the storage apparatus coupled to the host computer via the selected access path.

* * * * *